US009001005B2

(12) United States Patent
Abdollahi et al.

(10) Patent No.: US 9,001,005 B2
(45) Date of Patent: Apr. 7, 2015

(54) MODULAR HEADS-UP DISPLAY SYSTEMS

(71) Applicant: Recon Instruments Inc., Vancouver (CA)

(72) Inventors: Hamid Abdollahi, Vancouver (CA); Raymond C. M. Leung, Vancouver (CA)

(73) Assignee: Recon Instruments Inc., Vancouver (CA)

( * ) Notice: Subject to any disclaimer, the term of this patent is extended or adjusted under 35 U.S.C. 154(b) by 162 days.

(21) Appl. No.: 13/740,030

(22) Filed: Jan. 11, 2013

(65) Prior Publication Data
US 2013/0222213 A1 Aug. 29, 2013

Related U.S. Application Data

(60) Provisional application No. 61/604,993, filed on Feb. 29, 2012.

(51) Int. Cl.
G09G 5/00 (2006.01)
G02B 27/01 (2006.01)

(52) U.S. Cl.
CPC .............. G02B 27/0176 (2013.01); G09G 5/00 (2013.01); G02B 2027/0156 (2013.01); G02B 2027/0178 (2013.01)

(58) Field of Classification Search
CPC ............... G09G 3/003; H04N 13/0497; G02B 2027/014
USPC .......................................................... 345/7–9
See application file for complete search history.

(56) References Cited

U.S. PATENT DOCUMENTS

| 4,526,473 | A | 7/1985 | Zahn, III |
| 5,045,700 | A | 9/1991 | Crowson et al. |
| 5,331,149 | A | 7/1994 | Spitzer et al. |
| 5,343,313 | A | 8/1994 | Fergason |
| 5,491,510 | A | 2/1996 | Gove |
| 5,635,948 | A | 6/1997 | Tonosaki |
| 5,813,990 | A | 9/1998 | Ryll |
| 6,124,976 | A | 9/2000 | Miyazaki |
| 6,431,705 | B1 | 8/2002 | Linden |
| 6,483,646 | B2 | 11/2002 | Scott et al. |
| 7,038,639 | B1 | 5/2006 | Olstad et al. |

(Continued)

FOREIGN PATENT DOCUMENTS

| EP | 1777953 A1 | 4/2007 |
| WO | 2011/044680 A1 | 4/2011 |

(Continued)

OTHER PUBLICATIONS

Notice of Allowance dated Feb. 12, 2014 received in related Design U.S. Appl. No. 29/455,741.

(Continued)

Primary Examiner — Kevin M Nguyen
(74) Attorney, Agent, or Firm — Richard A. Johnson; Borden Ladner Gervais LLP

(57) ABSTRACT

A Heads-Up Display (HUD) system for mounting on a pair of goggles comprises a processing unit configured to be coupled to a strap of the goggles, a display unit connectable to the processing unit and comprising a display configured to display images under control of the processing unit, and a display mount configured to be coupled to the goggles and adjustably receive the display unit.

16 Claims, 20 Drawing Sheets

(56) References Cited

U.S. PATENT DOCUMENTS

| | | |
|---|---|---|
| D537,078 S | 2/2007 | Tanaka et al. |
| 7,192,137 B2 | 3/2007 | Ishibashi et al. |
| D559,250 S | 1/2008 | Pombo |
| 7,375,701 B2 | 5/2008 | Covannon et al. |
| D578,120 S | 10/2008 | Lowe et al. |
| 7,595,933 B2 | 9/2009 | Tang |
| 7,825,996 B2 | 11/2010 | Yamada et al. |
| 7,952,059 B2 | 5/2011 | Vitale et al. |
| D659,136 S | 5/2012 | Matsumoto |
| D659,137 S | 5/2012 | Matsumoto |
| D659,741 S | 5/2012 | Heinrich et al. |
| D660,341 S | 5/2012 | Olsson et al. |
| 8,203,502 B1 | 6/2012 | Chi et al. |
| D664,185 S | 7/2012 | Heinrich et al. |
| 8,212,859 B2 | 7/2012 | Tang et al. |
| 8,235,529 B1 | 8/2012 | Raffle et al. |
| D682,267 S | 5/2013 | Mase |
| D682,268 S | 5/2013 | Ricks et al. |
| 8,467,133 B2 | 6/2013 | Miller |
| 2003/0201911 A1 | 10/2003 | Kennedy |
| 2005/0116882 A1 | 6/2005 | Yamazaki et al. |
| 2007/0078552 A1 | 4/2007 | Rosenberg |
| 2008/0186586 A1 | 8/2008 | Yamamoto |
| 2009/0040296 A1* | 2/2009 | Moscato .................. 348/53 |
| 2009/0091838 A1* | 4/2009 | Zaloum et al. .............. 345/8 |
| 2009/0102986 A1* | 4/2009 | Yamamoto .............. 348/744 |
| 2010/0060551 A1 | 3/2010 | Sugiyama et al. |
| 2010/0097580 A1 | 4/2010 | Yamamoto et al. |
| 2010/0103077 A1 | 4/2010 | Sugiyama et al. |
| 2010/0254017 A1* | 10/2010 | Martins .................. 359/631 |
| 2011/0018903 A1 | 1/2011 | Lapstun et al. |
| 2011/0128364 A1 | 6/2011 | Ono |
| 2011/0211260 A1 | 9/2011 | Yamamoto |
| 2011/0213644 A1 | 9/2011 | Phene |
| 2012/0013843 A1 | 1/2012 | Jannard |
| 2012/0300978 A1 | 11/2012 | Eberl et al. |
| 2012/0310391 A1 | 12/2012 | Sanders |
| 2013/0257709 A1 | 10/2013 | Raffle et al. |

FOREIGN PATENT DOCUMENTS

| | | |
|---|---|---|
| WO | 2011/085501 A1 | 7/2011 |
| WO | 2013/000075 A1 | 1/2013 |

OTHER PUBLICATIONS

Karalis et al., "Efficient wireless non-radiative mid-range energy transfer", Annals of Physics, 323, (2008), pp. 34-48.

Kopin, "Kopin Golden-i Head-Mounted Display Delivers True Hands-free Mobility", Microsoft, May 2009, pp. 1-2.

Goddard, Louis, "Olympus announces Project Glass-style wearable display prototype", The Verge, Jul. 5, 2012.

Purcher, Jack, "The Next Step in Apple's Glass Project Revealed!", Patentably Apple, Dec. 7, 2012.

Partial European Search Reported dated Jun. 5, 2013 issued against corresponding European Application No. 13157144.0.

European Search Report dated Jul. 15, 2013 issued against corresponding European Application No. 13157144.0.

* cited by examiner

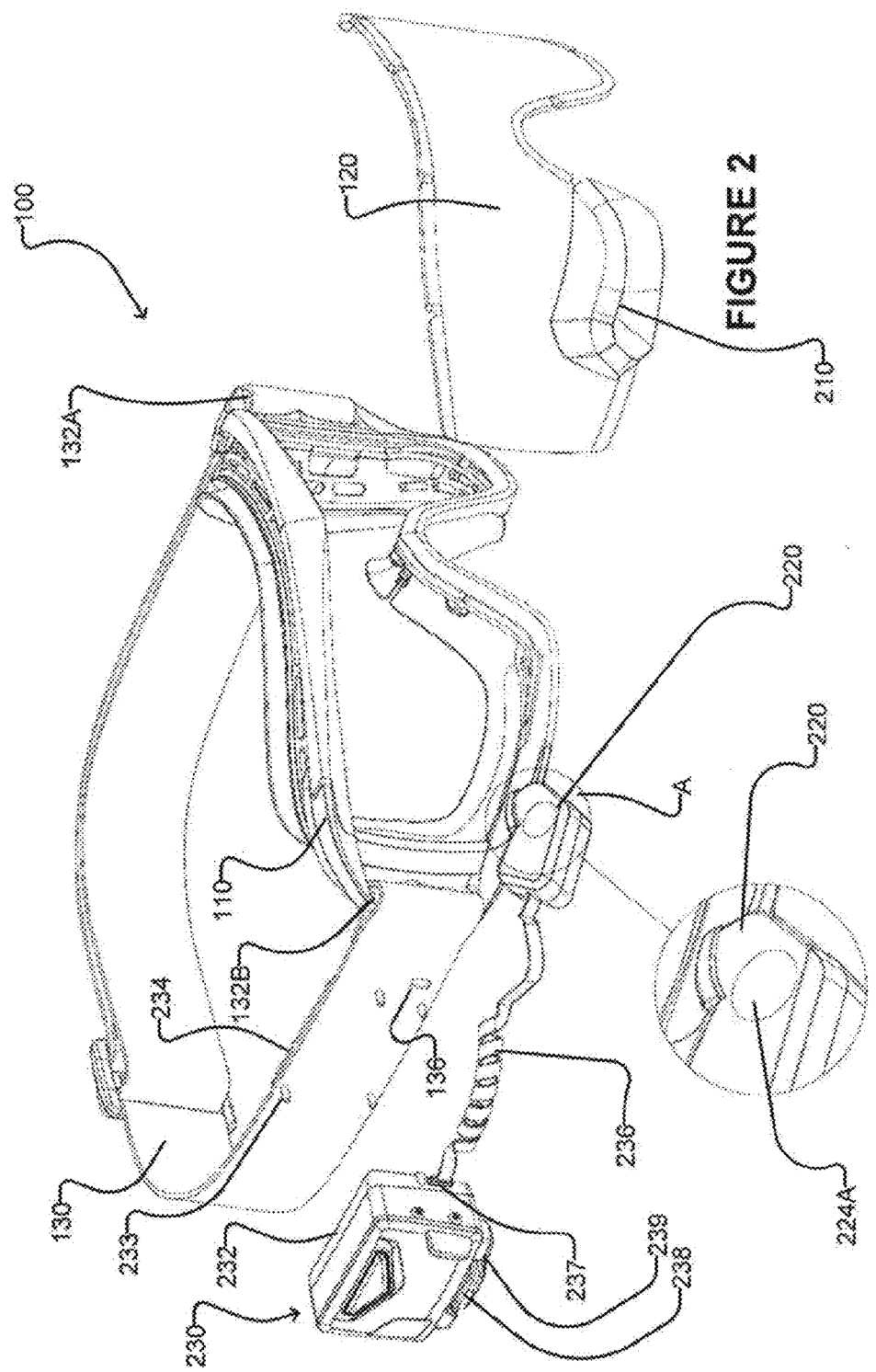

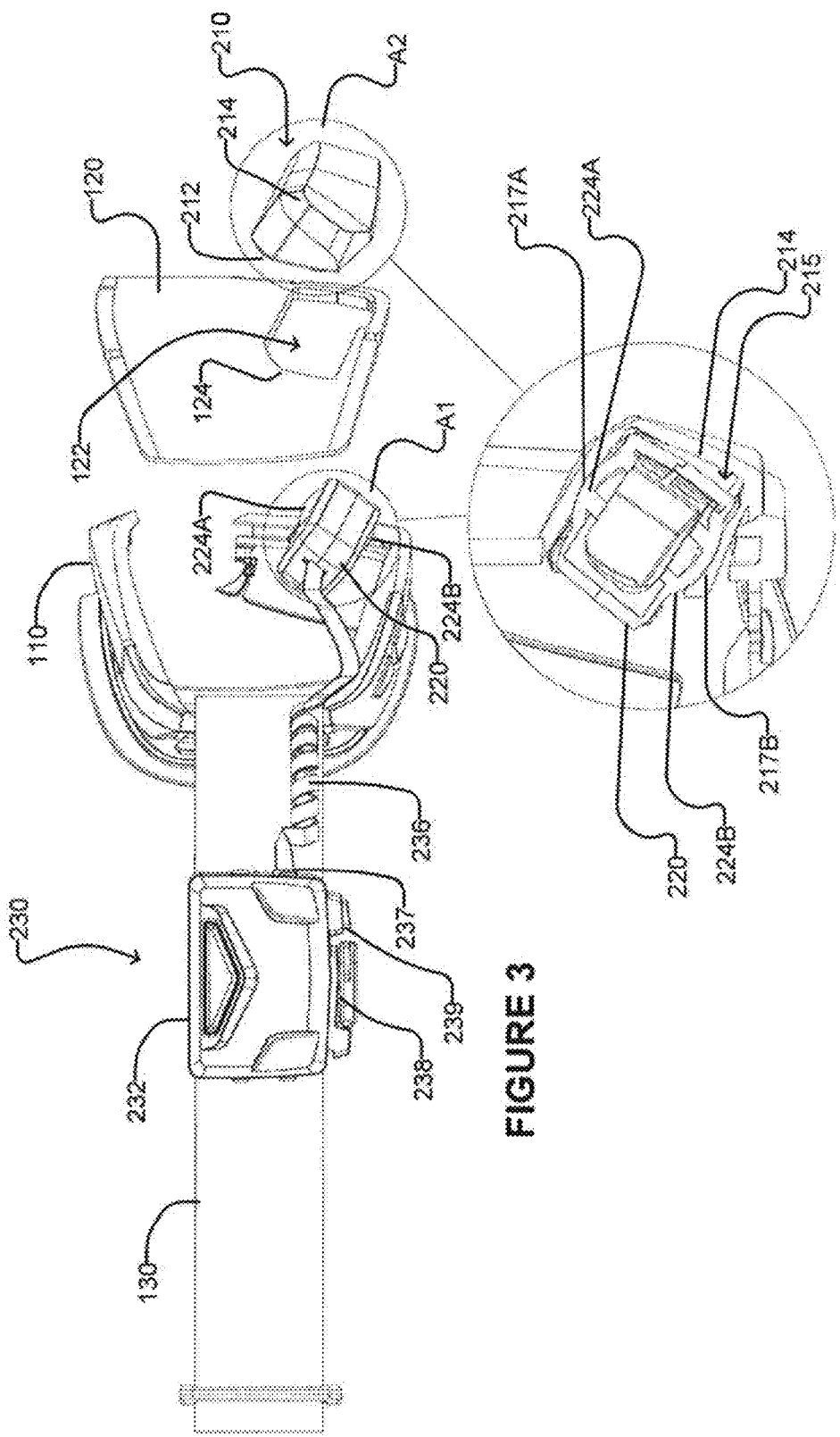

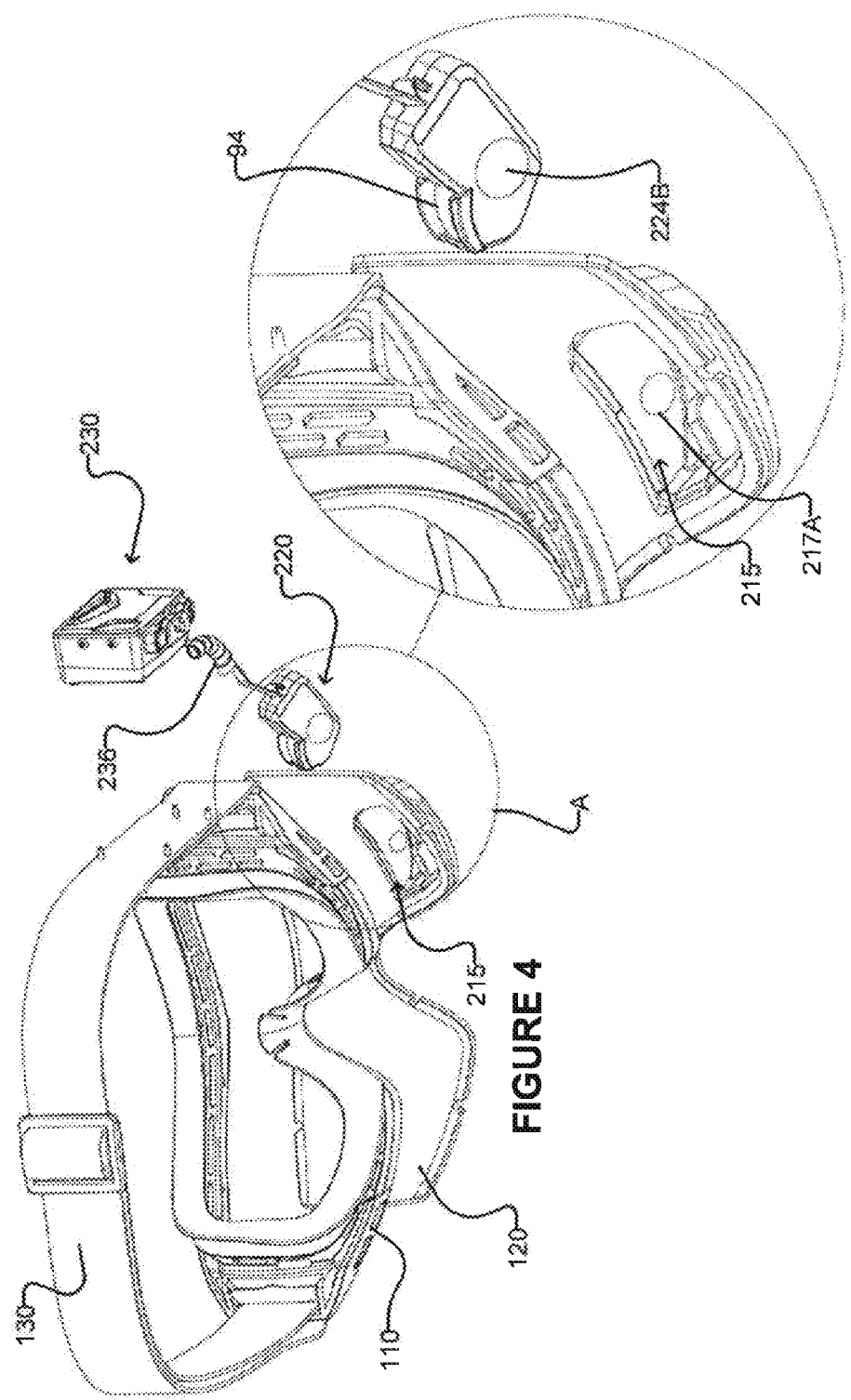

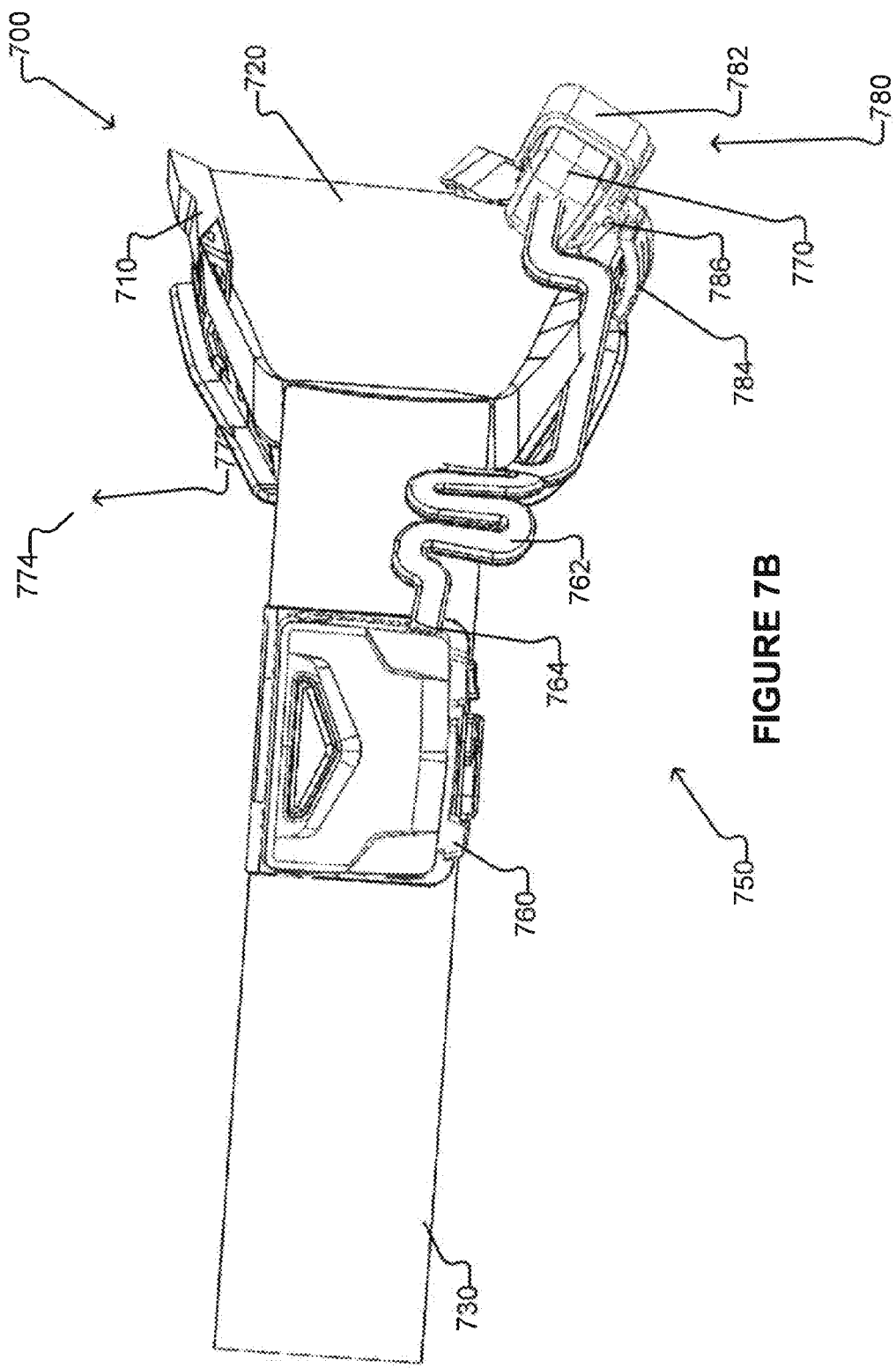

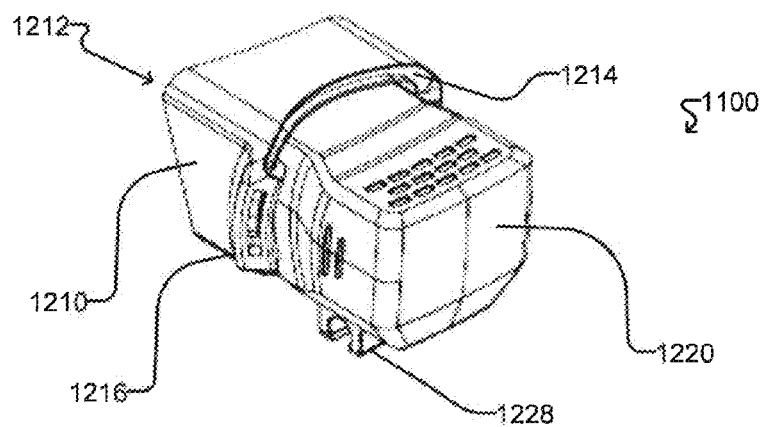
FIGURE 12
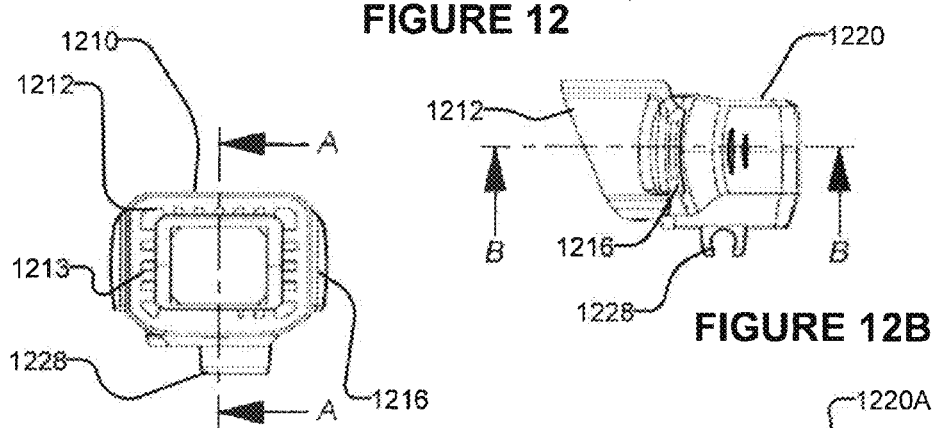
FIGURE 12A
FIGURE 12B
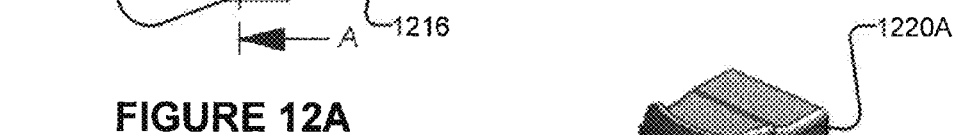
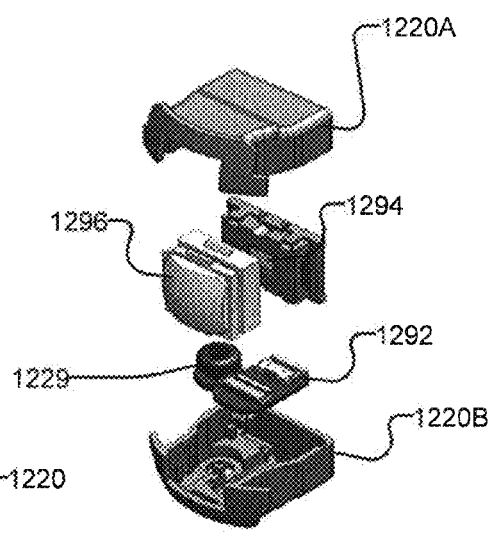
FIGURE 12C
FIGURE 12D

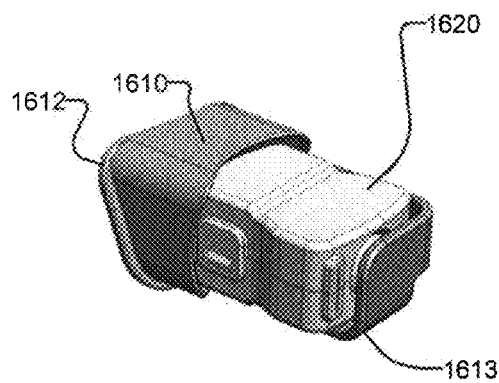
FIGURE 16A
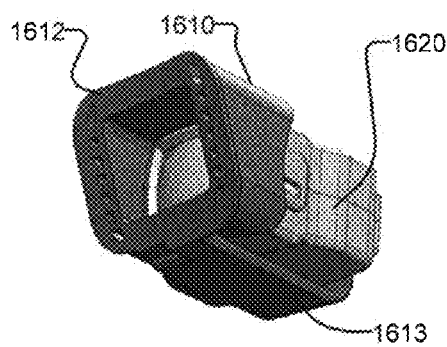
FIGURE 16B
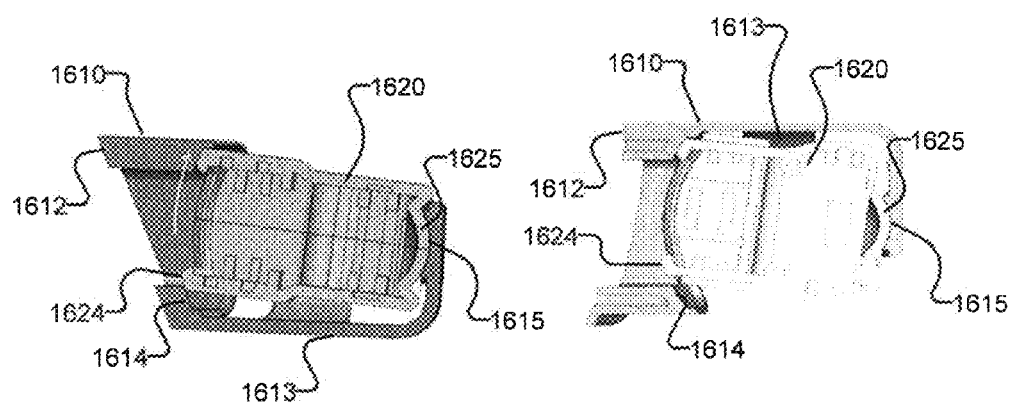
FIGURE 16C          FIGURE 16D

MODULAR HEADS-UP DISPLAY SYSTEMS

CROSS REFERENCE TO RELATED APPLICATIONS

This application claims the benefit of priority of U.S. Provisional Patent Application No. 61/604,993 filed Feb. 29, 2012, which is incorporated herein by reference in its entirety.

FIELD

This invention relates to modular Heads-Up Display (HUD) systems.

BACKGROUND

Any discussion of the prior art throughout the specification should in no way be considered as an admission that such prior art is widely known or forms part of general common knowledge in the field.

In many activities that people participate in, it is desirable or required that they wear headgear and/or head and/or eye protection. By way of non-limiting example, many skiers and snowboarders wear goggles, and many motorcyclists and hockey players wear helmets, which may have visors.

Also, there are systems for providing skiers, snowboarders and others taking part in physical activities with information regarding their performance or status. Some current solutions include handheld GPS devices, performance measurement units, wristwatches, and mobile phones. There also exist such information systems built into goggles or helmets such as those disclosed, for example, in International Applications No. PCT/CA2010/001592 and No. PCT/CA2011/050023, which are hereby incorporated by reference herein.

Further, many participants in sports and activities that require headgear already possess traditional headgear which does not provide information regarding their performance or status. These participants may not wish to purchase new headgear which does provide such information. Also, manufacturers of head protection may not wish to modify their existing products and production techniques to produce headgear which does provide information regarding their performance or status.

The inventors have determined a need for improved head-mounted information systems.

SUMMARY

This summary is provided to introduce a selection of representative concepts and aspects of the invention in a simplified form that are further described below in the description. This summary is not intended to identify key features or essential features of the claimed subject matter, nor is it intended to be used in any way that would limit the scope of the claimed subject matter.

One aspect provides a Heads Up Display (HUD) system for mounting on a pair of goggles. The HUD system comprises a processing unit configured to be coupled to a strap of the goggles, a display unit connectable to the processing unit and comprising a display configured to display images under control of the processing unit, and, a display mount configured to be coupled to the goggles and adjustably receive the display unit.

One aspect provides a pair of goggles adapted to receive a HUD system. The goggles comprise a frame, a strap coupled to the frame for holding the frame in place on a user's head, and a lens received in an opening in the frame, the lens comprising an enclosure coupled to the lens, the enclosure extending forwardly from the lens and defining a cavity adapted to receive a display unit.

One aspect provides a method of adapting a pair of goggles to receive a HUD system. The goggles comprise a frame, a strap coupled to the frame for holding the frame in place on a user's head, and a lens received in an opening in the frame. The method comprises forming an aperture in the lens, and attaching an enclosure to the lens around the aperture, the enclosure defining a cavity configured to receive a display unit of the HUD system.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings show non-limiting example embodiments.

FIG. 2 is an exploded view of the goggles with a modular HUD system of FIG. 1.

FIG. 2A is an enlarged view of the area of circle A of FIG. 2.

FIG. 3 is a side exploded view of the goggles with a modular HUD system of FIG. 1.

FIG. 3A is a sectional view through the display unit shown in circle A1 of FIG. 3 and the enclosure shown in circle A2 of FIG. 3.

FIG. 4 is a rear perspective exploded view of the goggles with a modular HUD system of FIG. 1.

FIG. 4A is an enlarged view of the area of circle A of FIG. 4.

FIG. 7B is a side view of the goggles of FIG. 7A.

FIG. 12 shows the display unit and display mount of FIG. 11 in isolation.

FIG. 12A is a front view of the display unit and display mount of FIG. 12.

FIG. 12B is a side view of the display unit and display mount of FIG. 12.

FIG. 12C is an exploded view of a display mount and display unit according to another embodiment.

FIG. 12D is an exploded view of the display unit of FIG. 12C.

FIGS. 16A through 16D show a display unit and display mount according to another embodiment.

Throughout the drawings and description like reference symbols are used to indicate like elements.

DETAILED DESCRIPTION

Figure 1:
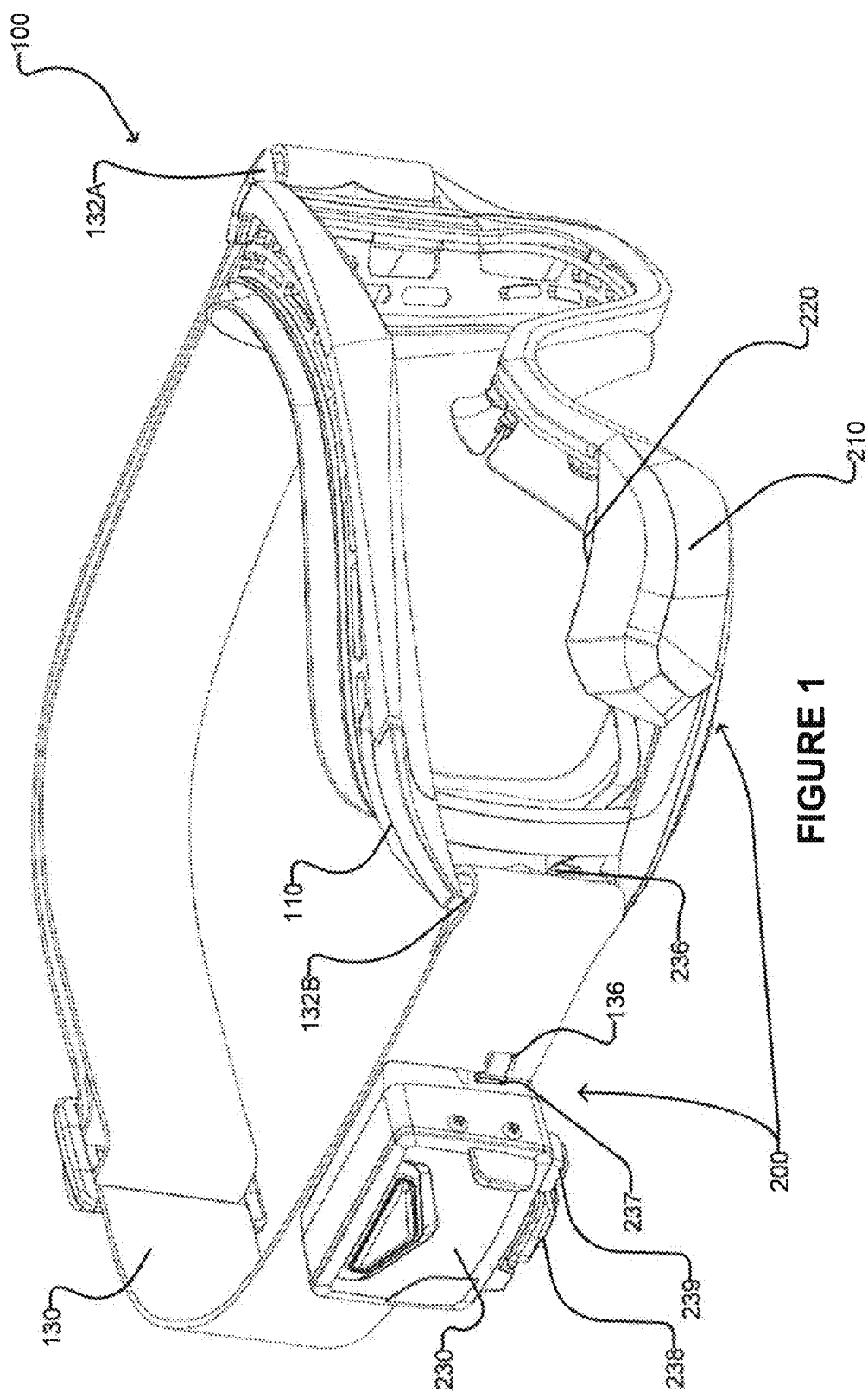
FIG. 1 is a perspective view of a pair of goggles with a Heads-Up Display (HUD) system according to an example embodiment.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Certain embodiments of the invention provide modular head-mounted information and display systems which may be coupled to headgear such as goggles, helmets or the like. Some embodiments provide modular head-mounted systems which are adjustable to accommodate installation in a variety of sizes and shapes of headgear. It is to be understood that embodiments may provide modular head-mounted systems for use with any type of headgear adapted to receive such systems.

FIGS. 1 to 4 show a pair of goggles 100 and a modular Heads-Up Display (HUD) system 200 according to an example embodiment. Goggles 100 are adapted to receive HUD system 200. Goggles 100 may be configured to be fully functional with or without HUD system 200 installed. Such a configuration permits goggles 100 to be sold separately from HUD system 200. In some embodiments goggles 100 may initially be produced as fully functional without HUD system 200 and later goggles 100 may be modified to receive HUD system 200.

Goggles 100 comprise a frame 110 which holds a lens assembly 120 and is connected to strap 130. Lens assembly 120 may comprise, for example, a cylindrical dual lens with a silicone seal, with an airtight space between the lenses to reduce fogging. The lenses may both have a 6 inch (15.25 cm) radial base curvature. The lenses may be coated with an anti fog sealant. Lens assembly 120 may also comprise any other type of single or dual lens assembly. The illustrated embodiment does not include ventilation holes in lens assembly 120, but lens assembly 120 may be ventilated in some embodiments. Frame 110 may also include a standard ventilation system 112 as known in the art. Frame 110 of goggles 100 is adapted to receive lens assembly 120. Strap 130 may be adjustable, flexible, and/or elastic as known in the art. Strap 130 may be removably or permanently attached to frame 110 at attachment points 132A, 132B.

HUD system 200 is coupled to goggles 100. In the illustrated embodiment, a portion of HUD system 200 is coupled to lens assembly 120, and a portion of HUD system 200 is coupled to strap 130. In some embodiments, portions of HUD system 200 may also be coupled to other locations on lens assembly 120 and/or strap 130, and/or to other components of goggles 100, such as, for example, frame 110.

HUD system 200 can be used by skiers or snowboarders or other athletes to increase the usefulness of their headgear. As discussed further below, HUD system 200 may sense various types of motion and other parameters and provide a user with real time information such as their position, their performance (e.g. speed, airtime, direction, video, etc.). In some embodiments, once installed, HUD system 200 is coupled to goggles 100 and does not interfere with the regular activities of the user.

As best seen in FIG. 3, lens assembly 120 has opening 122 defined therein configured to receive a display mount adapted to receive a display unit in the form of an enclosure 210. Enclosure 210 is configured to adjustably receive a display unit 220 of HUD system 200. Display unit 220 comprises a display 94, and is operably coupled to an electronics compartment 230 attached to strap 130 as described below. Compartment 230 may be coupled to goggles 100, for example by clipping or otherwise securing to strap 130. Compartment 230, while shown on strap 130 on the right side of frame 110 in the illustrated example embodiment, may be positioned on either side of frame 110. Similarly, opening 122, enclosure 210 and display unit 220 may be positioned on either half, or at any location, of lens assembly 120.

Enclosure 210 is coupled to lens assembly 120 to cover opening 122. Opening 122 has a perimeter 124 configured to substantially conform to a perimeter 212 of enclosure 210. In some embodiments, opening 122 may be formed when lens assembly 120 is manufactured. For example, lens assembly 120 may be formed with opening 122 therein by injection molding, three dimensional printing, or other techniques as known in the art. In other embodiments, lens assembly 120 may be modified after manufacturing to form opening 122. Opening 122 may be formed in lens assembly 120 with lens assembly 120 held in frame 110 in some embodiments, or may be formed after first removing lens assembly 120 from frame 110 in some embodiments. In some embodiments, opening 122 may be formed by cutting a portion of lens assembly 120. In other embodiments, opening 122 may be formed by a heated punch, a router, or other means. Opening 122 may be sized and shaped to allow a user to access and manipulate display unit 220 from the inside of goggles 100 in some embodiments. For example, in some embodiments, opening 122 may be sized to permit display unit 220 to pass therethrough.

Enclosure 210 comprises a shell 214, which defines a cavity 215 configured to receive display unit 220, as described below. Shell 214 may be made of a rigid material such as High Density Polyethylene (HDPE), Poly Vinyl Chloride (PVC), high density rubber or the like. In other embodiments shell 214 may be made of a deformable resilient material such as polystyrene, Low Density Polyethylene (LDPE), low density rubber or the like. Shell 214 may provide protection for display unit 220. In some embodiments, an exterior surface of shell 214 may be aerodynamically shaped to reduce or minimize wind resistance.

Enclosure 210 may be shaped to substantially conform to the shape of opening 122 in some embodiments. In some embodiments, perimeter 212 may be larger than opening 122 such that enclosure 210 overlaps onto a front face of lens assembly 110 around opening 112. In some embodiments enclosure 210 may comprise resiliently deformable couplings that provide for a snap-fit connection between enclosure 210 and opening 122. As used herein, the term "snap fit" refers to any releasable connection which is formed at least in part by resilient deformation in one of the connecting components. Such resilient deformation may be relieved once the snap fit connection is made. In other embodiments, enclosure 210 may be ultrasonically welded to lens assembly 120. Enclosure 210 may be welded to the perimeter 124 of opening 122 or outside of perimeter 124 of opening 122. Enclosure 210 may alternatively or additionally be coupled to opening 122 through an adhesive, magnets, screws, rivets, clips or the like.

Enclosure 210 may comprise a gasket (not shown) surrounding the perimeter 212. The gasket may be shaped to provide a seal between enclosure 210 and opening 122 of lens assembly 120. The gasket may be formed of a resiliently deformable material such as plastic, rubber, silicone, or the like. The gasket may be snap-fit to lens assembly 120. That is, the gasket may be resiliently deformed when inserted into opening 122 and return to its undeformed shape to prevent removal of gasket from opening 122 in the opposite direction of insertion.

As best seen in FIG. 3A, in the example embodiment display unit 220 is mounted within a cavity 215 defined in enclosure 210. Display unit 220 may comprise a display 94 and a display driver 92 (see FIG. 6) as discussed in further detail below. Cavity 215 may be configured to substantially receive display unit 220 within enclosure 210. Enclosure 210 may be coupled to display unit 220 through a ball and socket joint. In the embodiment of FIGS. 1-4, cavity 215 comprises sockets 217A, 217B. Sockets 217A, 217B may be shaped to receive ball portions 224A, 224B that are formed on opposed sides of display unit 220 to effectively form a ball and socket joint. The ball and socket joint allows for relative movement between display unit 220 and enclosure 210 such that a user can adjust the angle and position of display unit 220 to a user's preferred position or to provide a better viewing angle. In particular, the ball and socket joint may allow display unit 220 to pivot relative to enclosure 210 as ball portions 224A and 224B are rotated within sockets 217A, 217B. In other embodiments the ball and socket joint may be formed in other ways. For example, in some embodiments, ball portions similar to portions 224A and 224B may be formed on interior surfaces of shell 214 of enclosure 210, and sockets similar to sockets 217A and 217B may be formed on opposed sides of display unit 220.

Figure 5A:
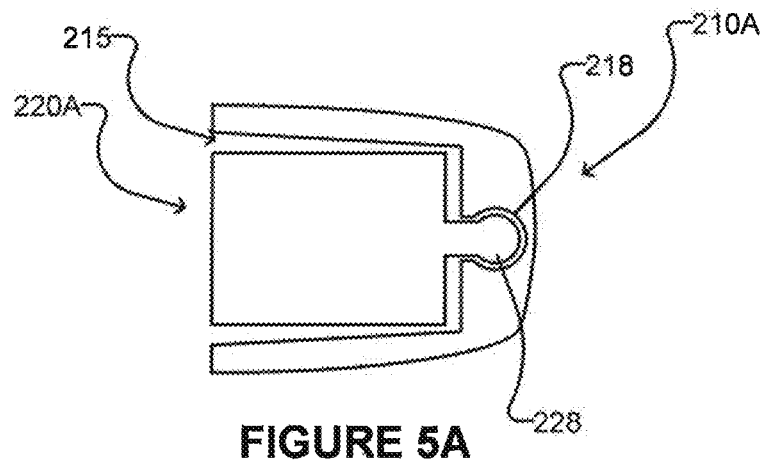
FIG. 5A is a sectional view of a display unit and enclosure according to another example embodiment.
Figure 5B:
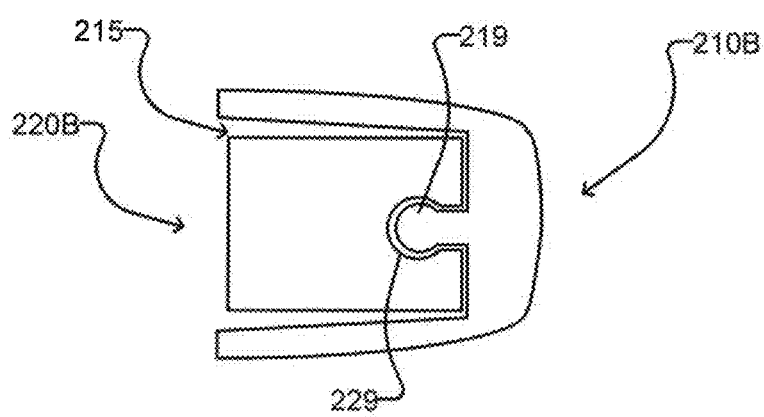
FIG. 5B is a sectional view of a display unit and enclosure according to another example embodiment.

FIGS. 5A and 5B show two other example embodiments with ball and socket joints. In FIG. 5A, enclosure 210A defines a socket 218 in a forward portion thereof, and display unit 220A comprises a ball portion 228 extending forwardly therefrom. In FIG. 5B, enclosure 210B comprises a ball portion 219 extending rearwardly from a forward portion thereof, and display unit 220B defines a socket 229 in a forward portion thereof.

Cavity 215 allows display unit 220 to be nested within enclosure 210. As a result, at least a portion of display unit 220 may be positioned outside of a surface of lens assembly 120 (i.e. further from a user than lens assembly 120). This provides for additional space between a user's face and the display of display unit 220, which provides for easier focusing on the display by a user. The additional space also may reduce any interference of the HUD system 200 with the ordinary activities of a user. Further, nesting display unit 220 within enclosure 210 may allow for a larger display and/or larger processors or drivers (and therefore faster processing of information) within display unit 220.

The positioning of the display and display unit 220 within or near lens assembly 120 allows a user to view the displayed information merely by moving their eyes. This may reduce the dangers inherent in, for example, a wrist based display where the user must either tilt their head down or raise their wrist to be able to view any displayed information. Such actions may be dangerous while in the midst of performing physical activities such as skiing, snowboarding, motorcycling or bicycling. Other embodiments may provide HUD systems wherein portions thereof may be located outside the frame to which the HUD system attaches.

As best seen in FIG. 2, compartment 230 may be attached to strap 130 by coupling a support plate 234 to a body 232 of compartment through strap 130 by way of screws 233. Body 232 and support plate 234 may additionally or alternatively be attached to strap 130 by way of rivets, snaps, clips or the like. In other embodiments, compartment 230 may comprise a slot or aperture (not shown) shaped to engage strap 130. Strap 130 may be disengaged from frame 110 at attachment point 132A (for example) and passed through a slot or aperture in compartment 230. Strap 130 may then be re-engaged with frame 110 at attachment point 132A.

Compartment 230 may be coupled to display unit 220 by means of a cable 236. Cable 236 may comprise a connector 237 configured to be removably received in a corresponding connecting feature of body 232 of compartment 230. Body 232 may also have one or more communication ports 238 and a power button 239 thereon. Ports 238 may be used to connect the electronic system housed in compartment 230 with other systems. Power button 239 may be used to turn the electronic system housed in compartment on and off. Ports 238 may be covered by a suitable flap or other protective structure to prevent moisture and debris from contacting ports 238. Cable 236 may supply a power and/or information connection between compartment 230 (and its associated sensor unit, processor unit and/or power unit) and display unit 220. In some embodiments, an opening 136 may be formed in strap 130 to permit cable 236 to pass therethough. Cable 236 may pass through frame 110 of goggles 100 in some embodiments. In some embodiments cable 236 is a spiral cable which can be extended to different lengths to accommodate use with a variety of sizes of goggles. In other embodiments cable 236 may be straight, wavy, wound around a retractable cable dispenser or the like. In some embodiments, cable 236 may pass through a ventilation system of frame 110.

In some embodiments cable 236 may be omitted and compartment 230 may be wirelessly connected with display unit 220. For example, information may be transferred by way of radio or other electromagnetic waves using wireless connections as known in the art. Power may also be transmitted wirelessly in some embodiments through, for example, non-radiative electromagnetic fields as described in Karalis et al., "Efficient wireless non-radiative mid-range energy transfer" Annals of Physics 323 (2008) 34-48 (http://www.mit.edu/~solijacic/wireless power_AoP.pdf).

Figure 6:
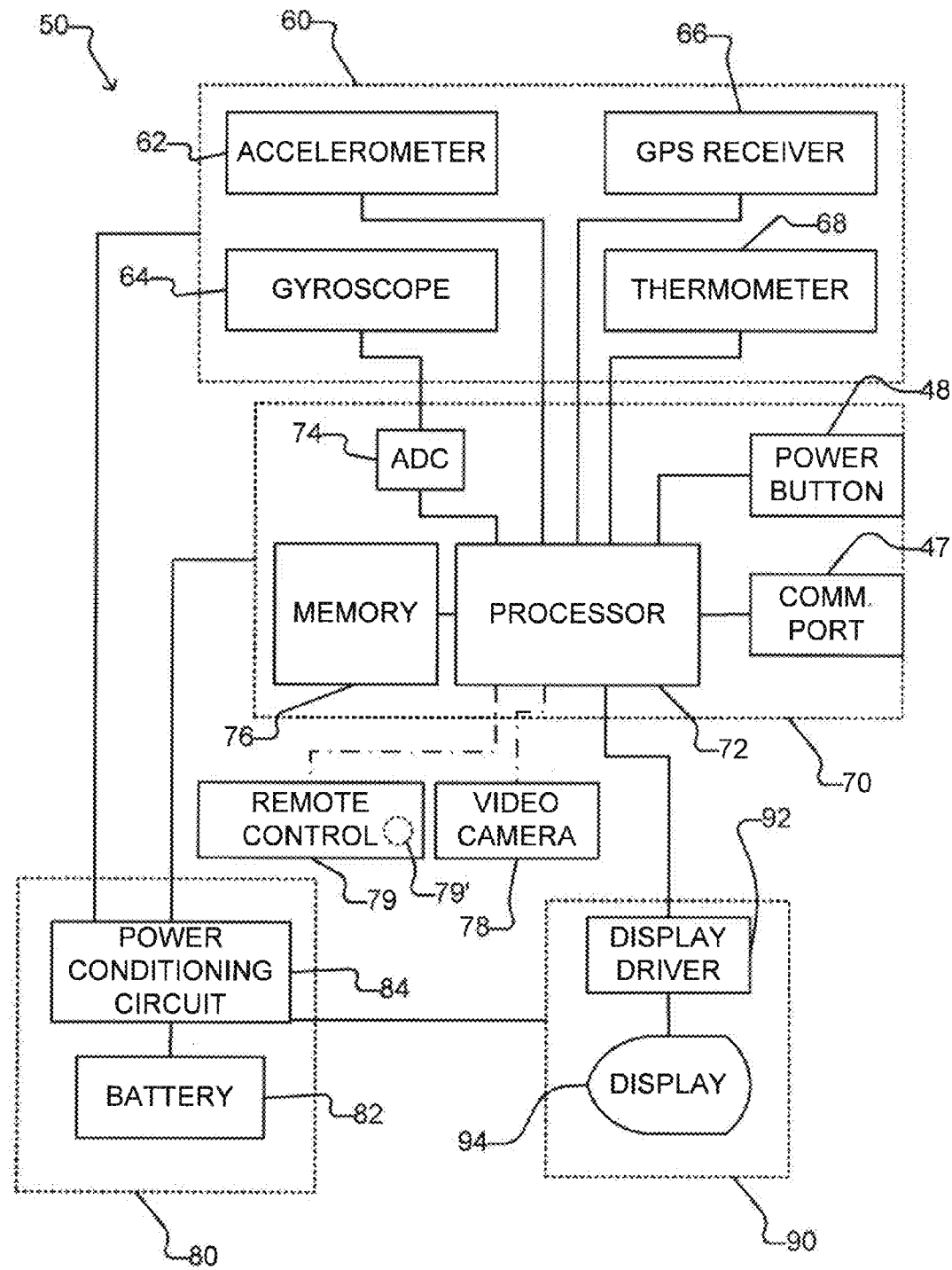
FIG. 6 is a schematic diagram of an electronic system of a modular HUD system according to an example embodiment.

FIG. 6 shows an example embodiment of an electronic system 50 suitable for use with a modular HUD system as described above. Electronic system 50 comprises sensor unit 60, processor unit 70, power unit 80 and display unit 90. With reference to the example HUD system 200 described above, sensor unit 60, processor unit 70 and power unit 80 may, for example, be substantially contained in compartment 230, and display unit 90 may, for example, be substantially equivalent to display unit 220 and/or substantially contained in optic enclosure 210.

In the illustrated embodiment, sensor unit 60 comprises a 3-axis accelerometer 62, a 3-axis gyroscope 64, a GPS receiver 66, and a thermometer 68. Accelerometer 62 and gyroscope 64 are collectively referred to herein as "INS"

(inertial navigation system) sensors. The INS sensors 62, 64 and GPS receiver 66 have complementary strengths and weaknesses such that their combined use provides for improved reliability and accuracy of measurement of position and altitude as compared to each sensor on its own.

Accelerometer 62 may comprise, for example, a micro-electro-mechanical system (MEMS) device which produces digital output signals representative of linear accelerations along three perpendicular axes. In some embodiments, accelerometer 62 may comprise a LIS331DL motion sensor manufactured by STMicroelectronics.

Gyroscope 64 may comprise, for example, two MEMS devices, one of which produces analog output signals representative of angular velocities about two perpendicular axes, and one of which produces an analog output signal about a third axis perpendicular to the other two axes. In some embodiments, gyroscope 64 may comprise an IDG-500 for measuring angular velocities about an x-axis and a y-axis, and an ISZ-500 for measuring angular velocity about a z-axis, both of which are manufactured by InvenSense, Inc.

GPS receiver 66 may comprise, for example a Wide Area Augmentation System (WAAS) enabled GPS receiver with a built-in system clock. GPS receiver 66 may, for example, output digital signals using a protocol such as NMEA 0183 or NMEA 2000. Thermometer 68 may comprise, for example, a digital thermometer.

In other embodiments, sensor unit 60 may comprise one sensor, some combination of sensors described above or other sensors such as 3G signal receivers, wireless internet receivers, audio radio receivers, television or video receivers or the like.

Processor unit 70 comprises a processor 72 which, in the illustrated embodiment, is connected to receive signals from accelerometer 62, gyroscope 64, GPS receiver 66 and thermometer 68 of sensor unit 60. Processor unit 70 may comprise an analog-to-digital converter (ADC) 74 connected between processor 72 and any of the sensors of sensor unit 60 which produce analog signals. In the illustrated embodiment, all sensors of sensor unit 60 except gyroscope 64 have digital outputs, so ADC 64 is connected only between gyroscope 64 and processor 62.

In the illustrated embodiment, processor unit 70 also comprises a memory 76. Memory 76 may comprise volatile and/or non volatile memory such as RAM, ROM, or other types of memory. Memory 76 may also comprise a removable media such as a USB drive, SD or miniSD card, etc. Memory 76 has stored therein various computer readable instructions for use by processor 72. In other embodiments, memory 76 may be integrated into processor 72.

Processor 72 may also be coupled to communications port 47 and power button 48. Communications port 47 may be accessible to a user and comprise one or more interfaces for wired or wireless communication with external devices. Communications port 47 may, for example, comprise one or more USB, Firewire, or other interfaces. Power button 48 may also be accessible to the user and operable to turn electronic system 50 on and off.

Processor unit 70 may also send and receive information from other devices such as mobile phones, personal computers, other modular HUD systems, etc. For example, processor 72 may receive images or video from a video camera 78 and send the same via an appropriate communications method. For example, in some embodiments processor 72 may control display 94 to act as a viewfinder for video camera 78 by displaying live images from video camera 78. Display of live images from camera 78 on display 94 may facilitate users capturing of intended scenes by providing feedback to users as to where camera 78 is pointing. Processor 72 may also cause display 94 to display stored images captured with video camera 78. Video camera 78 may be configured to capture both still and moving images in some embodiments. Video camera 78 may be physically connected to electronic system 50 or may be wirelessly connected through a Bluetooth communication protocol or other suitable communications methods. Processor 72 may also receive input commands from a remote control 79. Remote control 79 may be wirelessly connected to processor unit 70 and may comprise a wireless watch-type remote or be integrated into a user's gloves or mitts for example. Remote control 79 may also be integrated into video camera 78.

In some embodiments, remote control 79 may include a thermometer 79', and remote control 79 may be configured to transmit temperature readings taken by thermometer 79' to processor unit 70. Providing temperature readings taken by thermometer 79' in remote control 79 may provide for simplified temperature calibration in some embodiments, since remote control 79 may not be susceptible to as many thermal disturbances as thermometer 68 of sensor unit 60, which is typically located close to the user's head and may be covered by a hat or other articles. Providing thermometer 79' in remote control 79 may thus improve the accuracy of temperature readings in some embodiments. In some embodiments, thermometer 79' may be used in conjunction with thermometer 68 of sensor unit 60. In some embodiments, thermometer 68 of sensor unit 60 may be omitted, and thermometer 79' may provide the only temperature readings to processor unit 70.

Processor 72 is configured to transform signals received from sensor unit 60 to produce outputs representing various parameters relating to user performance, and other outputs. For example, processor 72 may produce outputs relating to one or more of position, orientation, time, speed, direction of travel, altitude, vertical drop, jump airtime, jump distance, spins, etc. Processor 72 may store the outputs and/or any other data in memory 76. Processor 72 may also produce a video signal to be displayed by display unit 90. In some embodiments, the video signal produced by processor 72 for displaying on display 90 comprises one or more of:

- an instantaneous speed indication;
- an average speed indication;
- a position indication;
- an orientation indication;
- a direction of travel indication;
- an altitude indication;
- a vertical drop indication;
- a jump airtime indication;
- a jump distance indication;
- a jump rotation indication;
- other motion indications;
- live or stored images from a camera (such as camera 94 or another camera);
- communication indications (e.g., text messages, emails, call indications, voicemail indications, etc.); and
- other visual indications.

In this example embodiment, power unit 80 comprises a battery 82 and a power conditioning circuit 84. Power conditioning circuit 84 receives electrical power from battery 82 and outputs electrical power at voltages and/or currents suitable for the various components of sensor unit 60, processor unit 70, and display unit 90. In some embodiments, power conditioning circuit 84 may comprise temperature control elements and short circuit protection elements contained in power compartment 34. In some embodiments, power conditioning circuit 84 may comprise power management elements contained in compartment 230.

Display unit 220 may comprise a display driver 92 to receive the video signal from processor 72. Display driver 92 is configured to generate driving signals based on the video signal, and to provide the driving signals to a display 94 as described above. In some embodiments, display driver 92 is contained in display unit 220. In some embodiments, display driver 92 may be directly connected or connectable to receive video signals from camera 78.

Display 94 may comprise, for example, a Quarter Video Graphics Array (QVGA) having a 320×240 resolution and 16 bit colors. In some embodiments, display 94 may comprise, a micro LCD illuminated by a suitable backlight. In other embodiments, other types of displays may be used, such as, for example, LED or OLED displays, electroluminescent (EL) displays, or the like. In some embodiments, a projector may be configured to project information to be displayed onto the lens. The projector may, for example, be positioned to project information to be displayed onto a portion of the lens near the edge of the user's field of view.

In the example embodiment of FIGS. 1 to 4, display driver 92 and display 94 may contained within display unit 220, while sensor unit 60, processor unit 70 and power unit 80 may be contained within compartment 230. In other embodiments components may be located in other locations. For example, sensor unit 60 and/or processor unit 70, or portions thereof may be located within display unit 220 in some embodiments.

Other embodiments may provide HUD systems with variations of the features described above and/or different features from those described above. Such variations and/or different features may be used in the alternative to or in addition to the features described above, or with each other in different combinations and permutations than the example embodiments discussed herein.

Figure 7A:
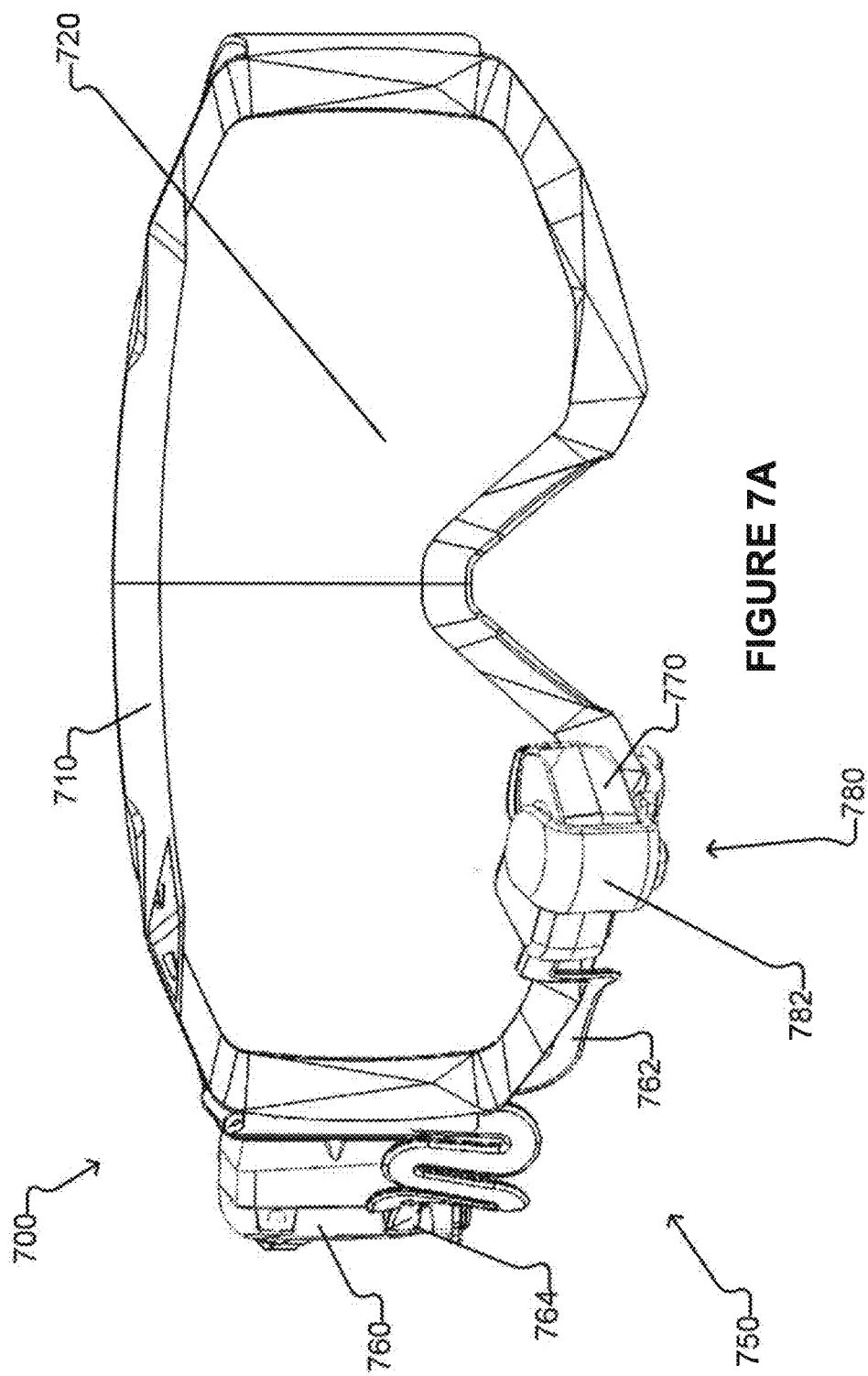
FIG. 7A is a front view of a pair of goggles with a modular HUD system according to another example embodiment.

FIGS. 7A and 7B show an example of a pair of goggles 700 with a HUD system 750 according to another embodiment. Goggles 700 may comprise a conventional pair of goggles having a frame 710, a lens assembly 720 and a strap 730. HUD system 750 comprises a compartment 760 (which may be substantially similar to compartment 230 described above) coupled to strap 730. Compartment 760 is coupled to a display unit 770 by a cable 762 which may be removably connected to compartment 760 by a connector 764. Display unit 770 is coupled to frame 710 by a display mount in the form of a clip assembly 780. Clip assembly 780 may, for example, be configured to engage a lower portion of frame 710. In the illustrated example, clip assembly 780 comprises a bracket 782 configured to receive display unit 770. Display unit 770 may, for example, be adjustably received in bracket 782 to provide one or two degrees of freedom for adjustment of display unit 770. For example, in some embodiments display unit 770 is pivotally coupled to bracket 782. In some embodiments, display unit 770 may be coupled to bracket 782 by a ball and socket joint similar to the examples discussed above. Clip assembly 780 also comprises a thin portion (not shown) extending downwardly form bracket 782 and configured to fit between frame 710 and lens assembly 720. Clip assembly 780 also comprises a clamp assembly 784 pivotally coupled to bracket 782 by a pin 786. Clamp assembly 784 is configured to be rotated about pin 786 to engage the underside of the bottom portion of frame 710 when bracket 782 is in place. In some embodiments clamp assembly 784 is configured to make a snap-fit connection with the underside of the bottom portion of frame 710.

Figure 8:
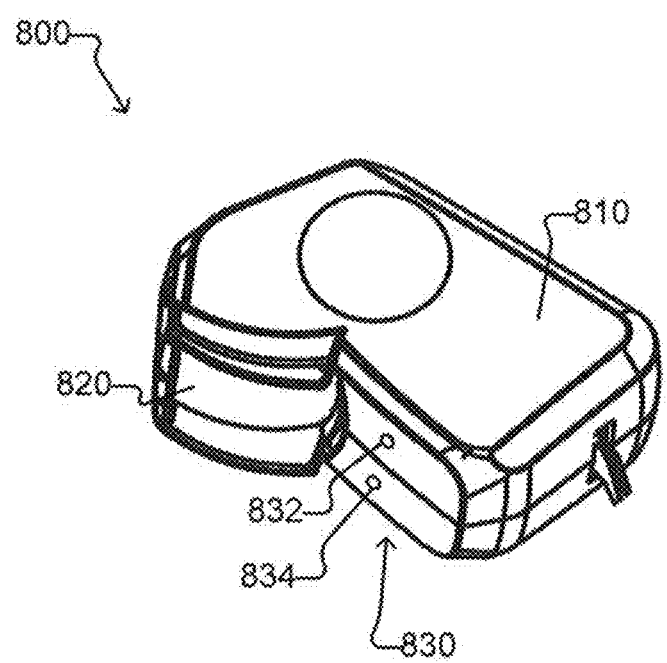
FIG. 8 is a perspective view of a display unit of a HUD system according to another example embodiment.

FIG. 8 shows an example of a display unit 800 according to another embodiment. Display unit 800 comprises a housing 810 which contains a display driver (not shown) and a display 820. Display unit 800 may be substantially similar to display unit 220 described above, except that display unit 800 comprises a glance detector 830 configured to detect when a user looks at display 820. Glance detector 830 may be operatively coupled to the display driver and configured to provide a signal to the display driver indicative of whether or not the user is looking at display 820, and the display driver may be configured to maintain display 820 in an off state or a power saving state unless the user is looking at display 820. In the illustrated embodiment, glance detector 830 comprise an infrared transmitter 832 and an infrared receiver 834 operatively coupled to processing elements. Infrared transmitter 832 emits infrared light which reflects off of a user's eye and is received by infrared receiver 834. Through appropriate calibration, the processing elements of glance detector 830 may determine from the reflected infrared light received at receiver 834 whether or not the user is looking at display 820. In other embodiments, glance detector 830 may comprise one or more brightness sensors configured to capture ambient light reflecting off of a user's eye to determine whether or not the user is looking at display 820. Further details of example methods, apparatus and systems for controlling display 820 based on where the user is looking are described in US provisional patent application No. 61/682,675, which is hereby incorporated by reference herein.

Figure 9:
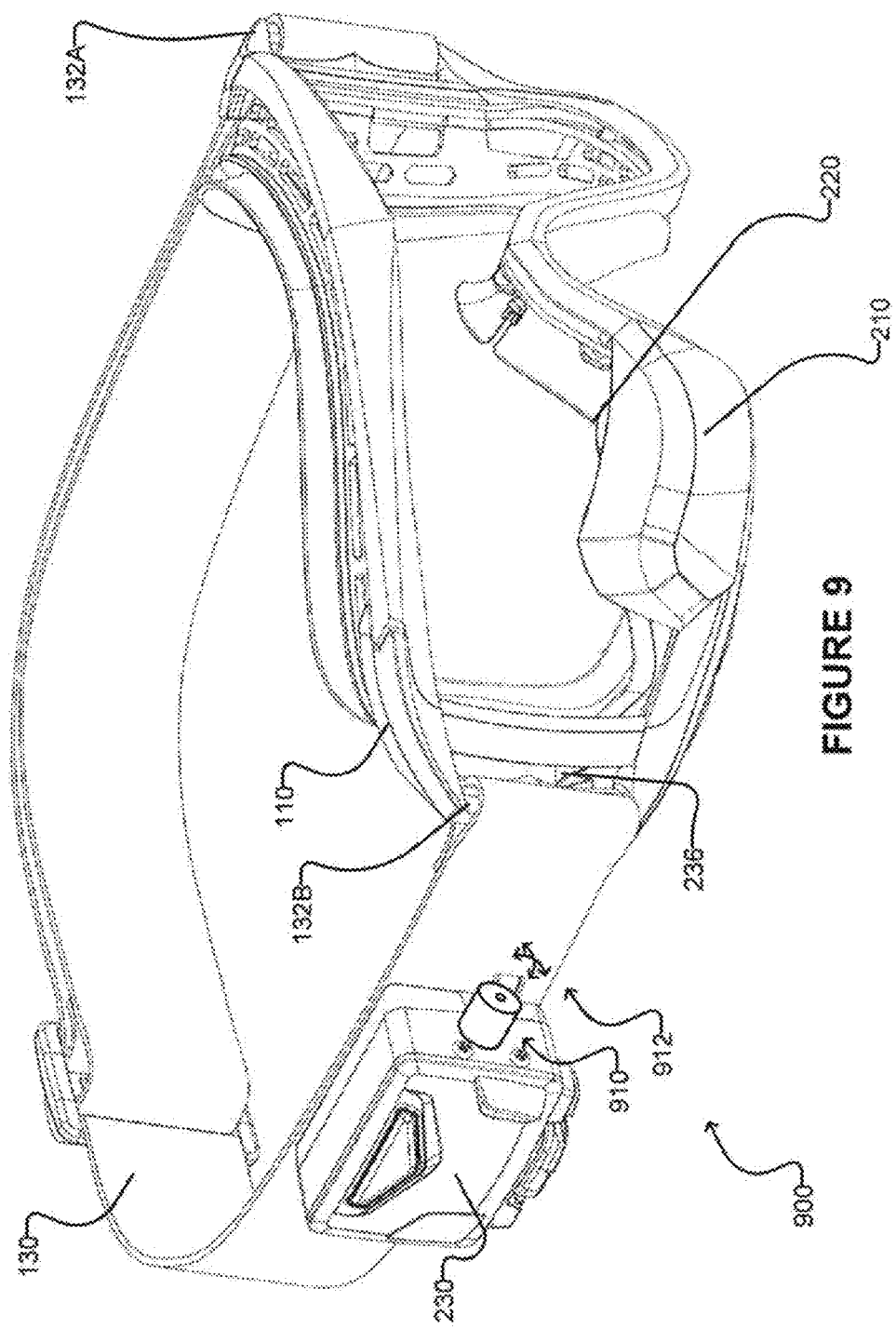
FIG. 9 is a perspective view of a pair of goggles with a modular HUD system according to another example embodiment.

FIG. 9 shows a pair of goggles with a HUD system 900 according to another embodiment. The goggles and HUD system 900 of FIG. 9 may be substantially similar to goggles 100 and HUD system 200 described above (and thus will not be described again), except that system 900 comprises a camera 910 mounted on compartment 230. Camera 910 may be adjustably attached to compartment 230 to allow panning and tilting, as indicated by arrows 912.

Figure 10:
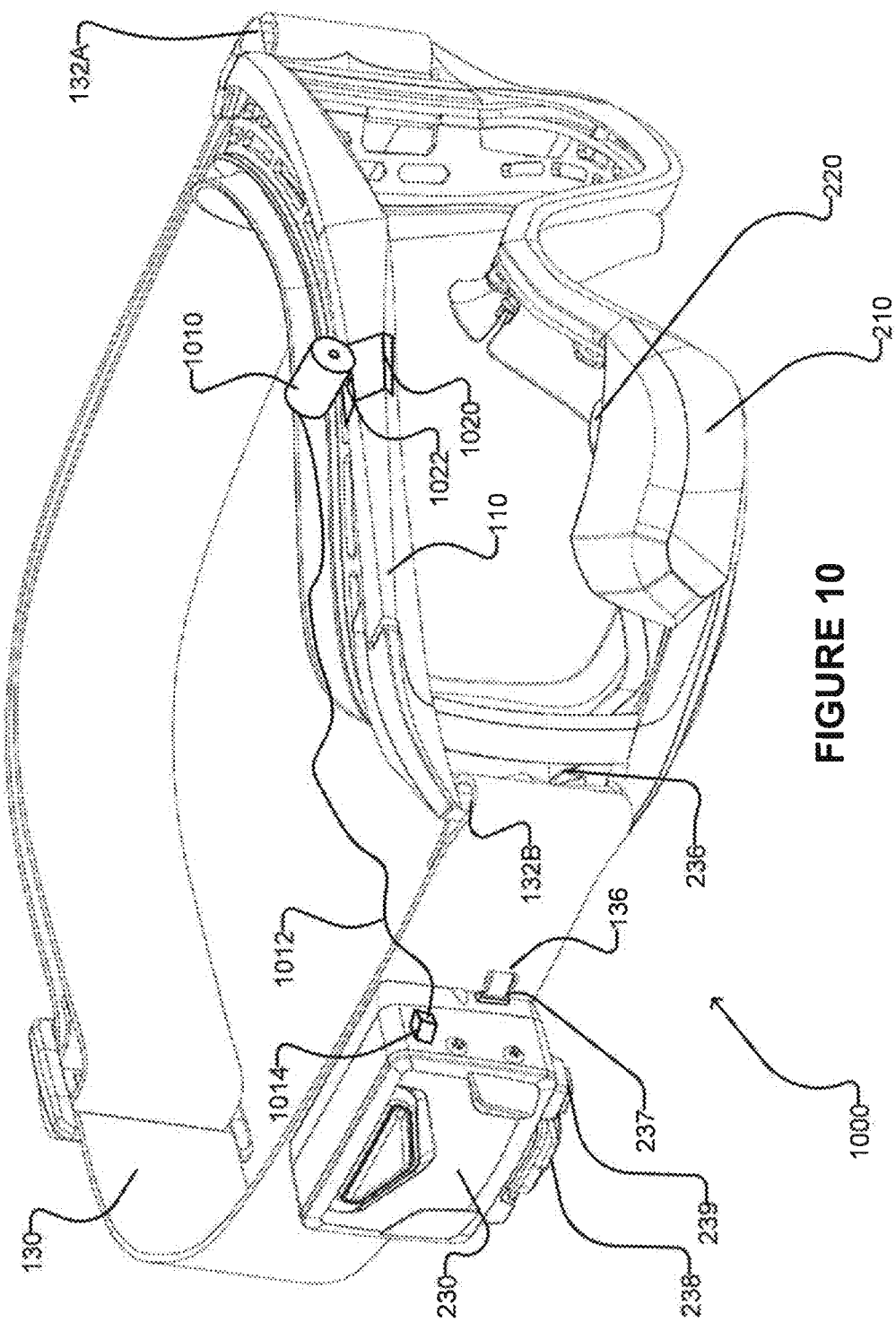
FIG. 10 is a perspective view of a pair of goggles with a modular HUD system according to another example embodiment.

FIG. 10 shows a pair of goggles with a HUD system 1000 according to another embodiment. The goggles and HUD system 1000 of FIG. 10 may be substantially similar to goggles 100 and HUD system 200 described above (and thus will not be described again), except that system 1000 comprises a camera 1010 mounted on a clip 1020 configured to attach to an upper portion of frame 110. Camera 1010 may be attached to compartment clip 1020 by an adjustable mounting element 1022 to allow panning and tilting of camera 1010. Camera 1010 may be operatively coupled to the electronic system in compartment 230 by a cable 1012 with a connector 1014 configured to be removably coupled to compartment 230.

Figure 11:
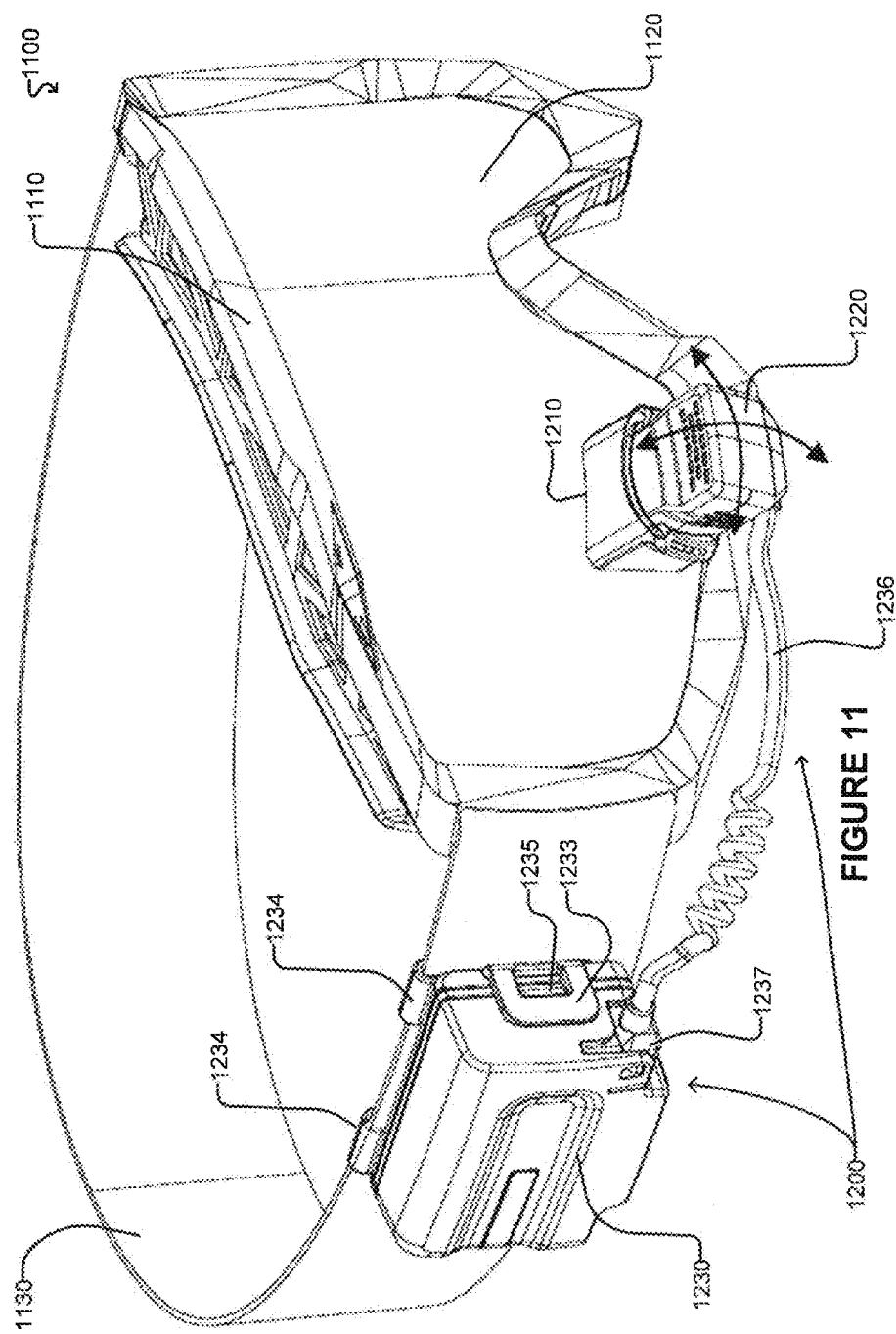
FIG. 11 is a perspective view of a pair of goggles with a modular HUD system according to another example embodiment.
Figures 11A, 11B:
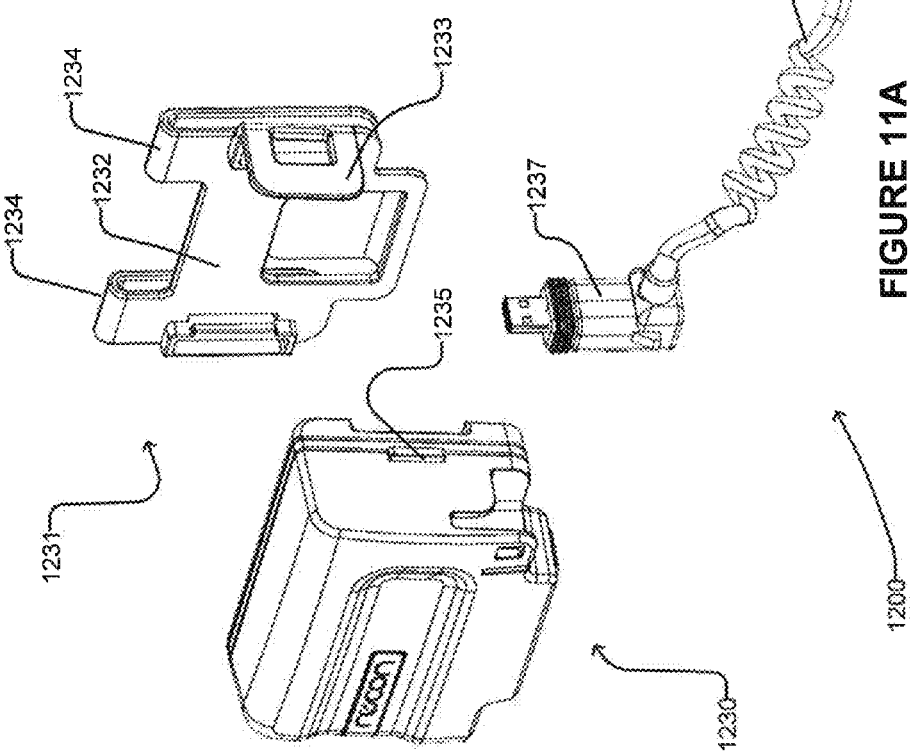
FIG. 11A is an exploded view of the HUD system of FIG. 11.
FIG. 11B shows the strap connector of FIG. 11 in isolation.

FIG. 11 shows a pair of goggles 1100 with a HUD system 1200 according to another embodiment. FIG. 11A shows an exploded view of the components of HUD system 1200. Goggles 1100 include a frame 1110, a lens assembly 1120 and a strap 1130. The goggles 1100 of the FIG. 11 embodiment may, for example, be any type of conventional goggles. HUD system comprises a display mount 1210, a display unit 1220 and an electronics compartment 1230. Display mount 1210 is adhesively attached to lens assembly 1120, and display unit 1220 is adjustably received in display mount 1210 as described further below.

Electronics compartment 1230 is attached to strap 1130 by a strap connector 1231 in the illustrated embodiment. The outer side of strap connector 1231 is best seen in FIG. 11A, and the inner side of strap connector 1231 is best seen in FIG. 11B. Strap connector 1231 comprises first and second protrusions 1232 and 1233 on the outer side thereof, and clips 1234 on the inner side thereof configured to engage strap 1130. The first protrusion 1232 has a tab configured to be inserted in a corresponding slot (not shown) in one end of electronics compartment 1230, and the second protrusion 1233 has a slot configured to receive a tab 1235 on the opposite end of electronics compartment 1230. It is to be understood that electronics compartment 1230 may be attached to strap 1130 by other mechanisms in other embodiments.

A cable 1236 operably connects electronics compartment 1230 to display unit 1220. Cable 1236 may comprise a connector 1237 configured to be removably received in a corresponding connecting feature of the body of electronics compartment 1230. Electronics compartment 1230 may also have one or more communication ports and a power button thereon (not shown), similar to compartment 230 described above with reference to the embodiment of FIGS. 1 and 2. In the illustrated embodiment, cable 1236 is a spiral cable which can be extended to different lengths to accommodate use with a variety of sizes of goggles. In other embodiments cable 1236 may be straight, wavy, wound around a retractable cable dispenser or the like.

Referring to FIG. 12 through 14B, display mount 1210 comprises a front face 1212 configured to conform to the shape of lens assembly 1130. As used herein with reference to display mount 1210 and display unit 1220, the term "front" and related terms are used to refer to the direction closer to lens assembly 1130, and the term "rear" and related terms are used to refer to the opposite direction. The rear portion of display mount 1210 comprises a concavely-curved surface 1214 and side portions 1216 having slots (not specifically enumerated) therein adapted to adjustably receive display unit 1220, as described further below. The display mount has a viewing passage between the front and rear portions, and the viewing passage has an inner surface 1213 which is textured (e.g., with ridges as in the illustrated example) to reduce the amount of light reflected therefrom, thereby improving the visibility of images displayed on the display unit 1220. The bottom of display unit 1220 may have an optional cable clip 1228 thereon adapted to hold cable 1236.

The front face 1212 of display mount 1210 is configured to be adhesively coupled to lens assembly 1130. As shown in FIG. 12C, an adhesive sealing gasket 1211 may be provided for attaching display mount 1210 to lens assembly 1130. In some embodiments, gasket 1211 may comprise double sided tape such as, for example, 3M™ VHB™ tape. A grommet 1229 may be provided in the underside of display unit 1220, and sized to allow cable 1236 to pass therethrough to the interior of display unit 1220 and provide a seal around cable 1236.

As shown in FIG. 12D, display unit 1220 comprises upper and lower housing sections 1220A and 1220B which enclose a display driver 1292 and a display 1294, which may be substantially similar to display driver 92 and display 94 described above. A display lens 1296 is positioned at the front of display unit 1220 between housing sections 1220A and 1220B and configured to magnify images on display 1294 for viewing by a user. The interfaces between housing sections 1220A and 1220B, display lens 1296 and grommet 1229, as well as the seal between grommet 1229 and cable 1236 (not shown in FIG. 12D) are preferably water-tight to prevent moisture or other contaminants from getting inside display unit 1220.

As best seen in FIGS. 13A, 13B, 14A and 14B, the front of display unit 1220 comprises a convexly-curved surface 1224 shaped to conform to concavely-curved surface 1214 of display mount 1210. Surfaces 1214 and 1224 have generally spherical curvatures in some embodiments. A sealing gasket 1225 may be provided around surface 1224 to provide a seal between display unit 1220 and display mount 1210.

Figure 13A:
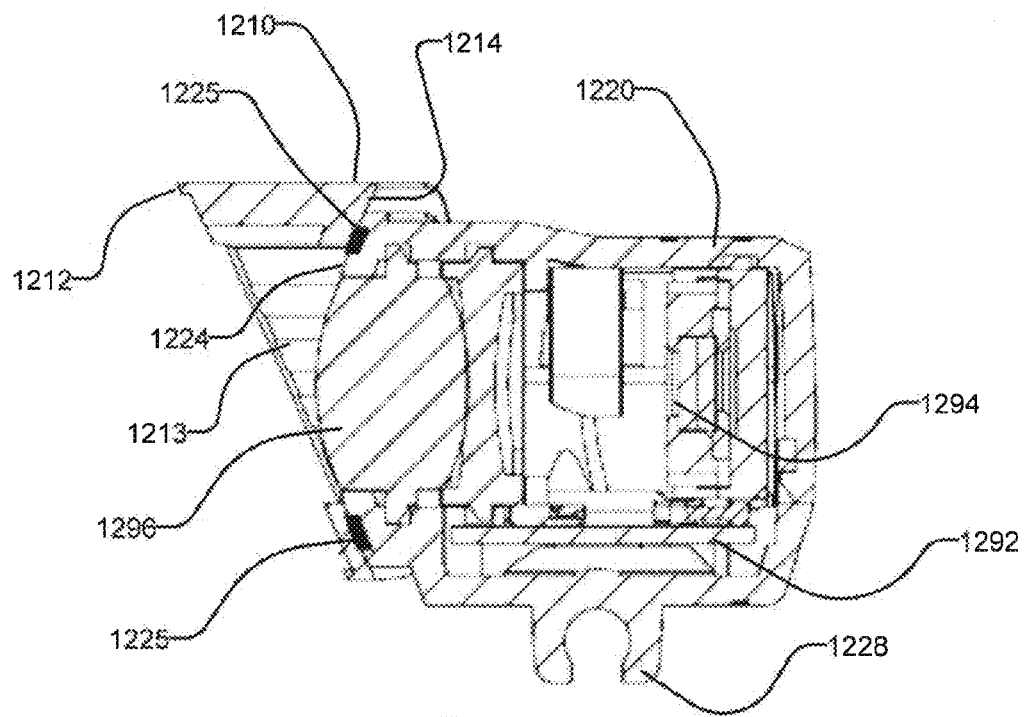
FIG. 13A is a sectional view taken along the line A-A in FIG. 12A.
Figure 13B:
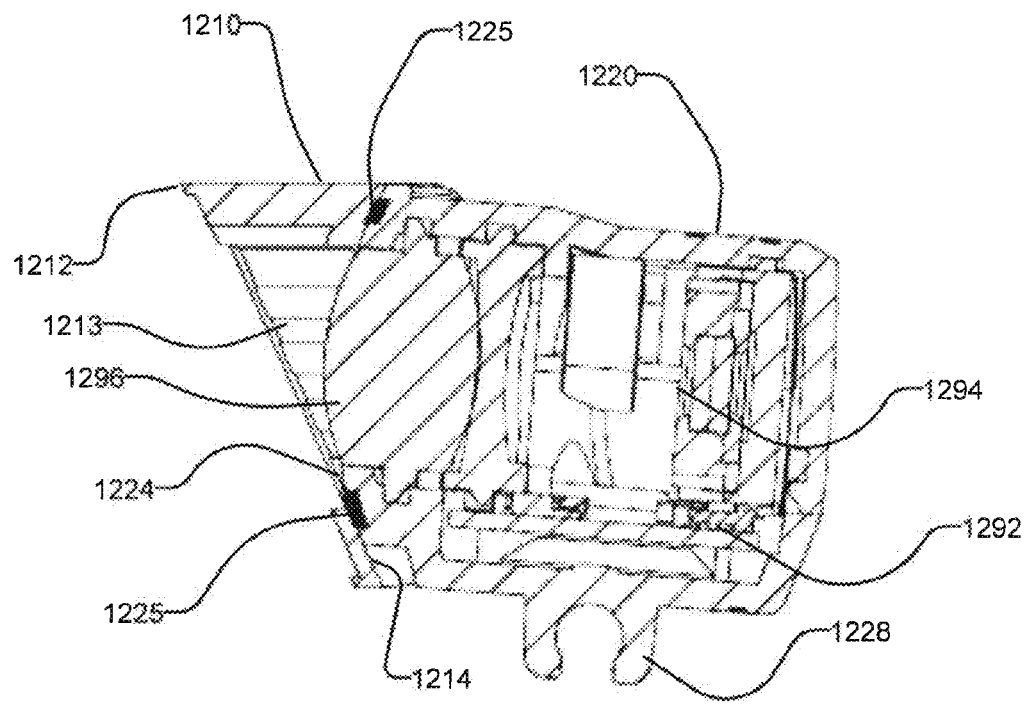
FIG. 13B shows the same view as FIG. 13A with the pitch angle of the display unit adjusted.
Figure 14A:
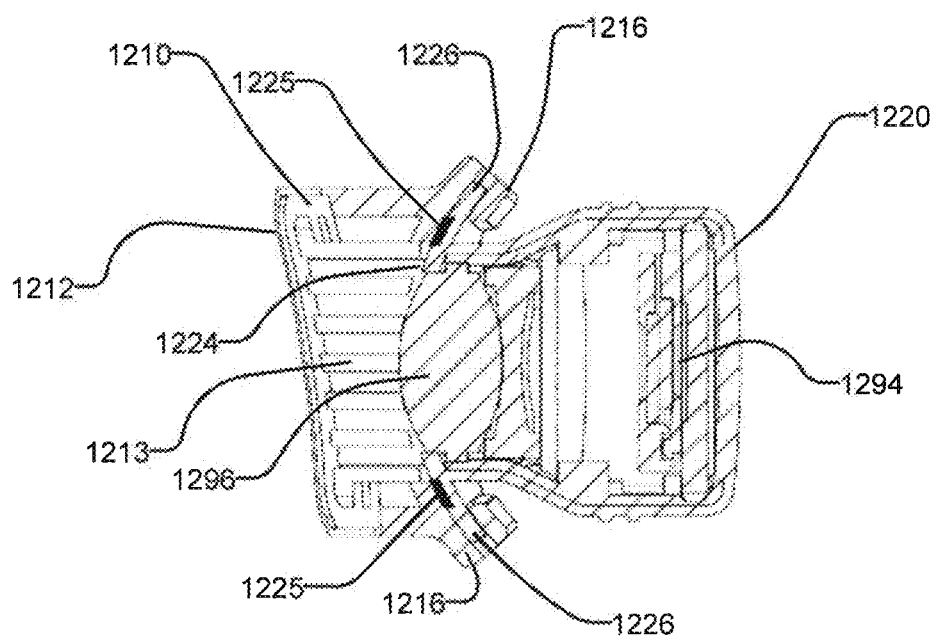
FIG. 14A is a sectional view taken along the line B-B in FIG. 12B.
Figure 14B:
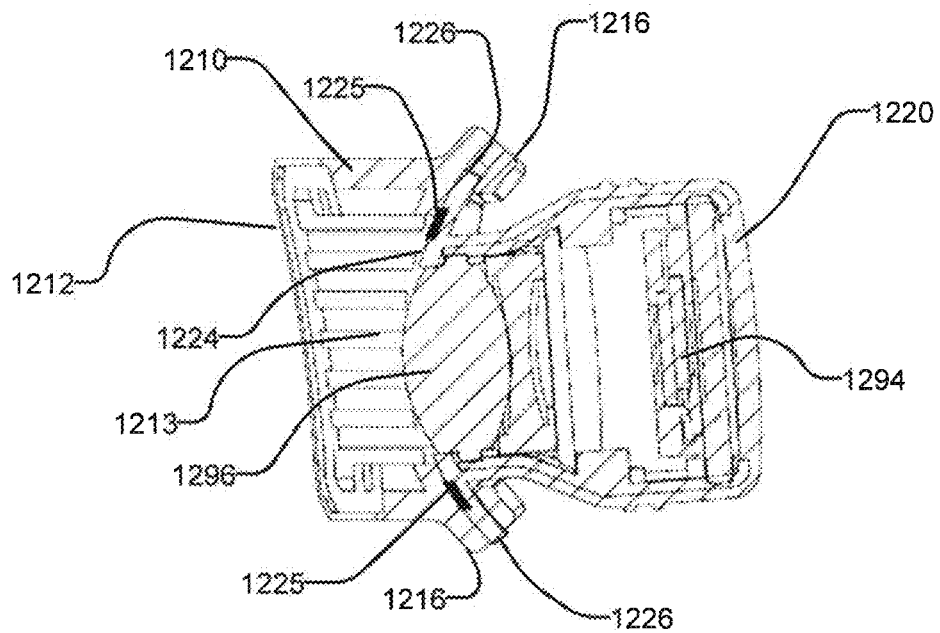
FIG. 14B shows the same view as FIG. 14A with the yaw angle of the display unit adjusted.

Display unit 1220 also has tabs 1226 extending outwardly from the sides of surface 1224 and sized to be received in slots in side portions 1216 of display mount 1210. In some embodiments, the tabs 1226 are held captive in the slots in the side portions 1216 of the display mount such that the display unit 1220 may not be removed from the display mount 1210. In some embodiments, the tabs 1226 may only be removed from the slots in the side portions 1216 of the display mount by using a key (not shown) or the like (e.g., by inserting the key to remove a portion of the side portions 1216 such that the display unit 1220 may be removed). The slots in side portions 1216 of display mount 1210 may be longer in the vertical direction than tabs 1226 to permit adjustment of the pitch angle of display unit 1220, as shown in FIGS. 13A and 13B. The distance between side portions 1216 is greater than a width of display unit 1220 rearward of tabs 1226 to permit adjustment of the yaw angle of display unit 1220, as shown in FIGS. 14A and 14B. In some embodiments, the angle of display unit 1220 relative to display mount 1210 may be adjusted by about 5 degrees left or right from a "nominal" position (e.g. the position as shown in FIGS. 13A and 14A), about 4 degrees downward from the nominal position and about 6 degrees upward from the nominal position. As one skilled in the art will appreciate, different available adjustment angles may be provided in other embodiments by changing the sizes and spacing side portions 1216 and the slots therein, tabs 1226 and/or the housing of display unit 1220.

Figure 15A:
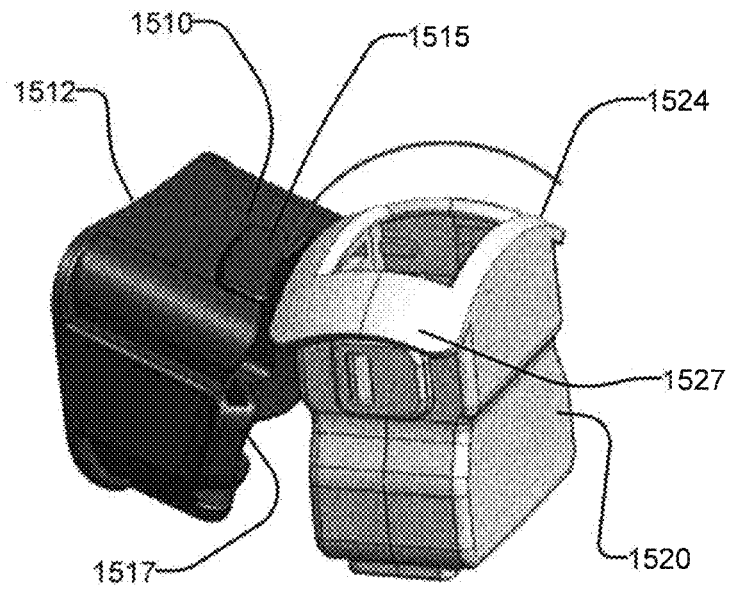
FIGS. 15A and 15B show a display unit and display mount according to another embodiment.
Figure 15B:
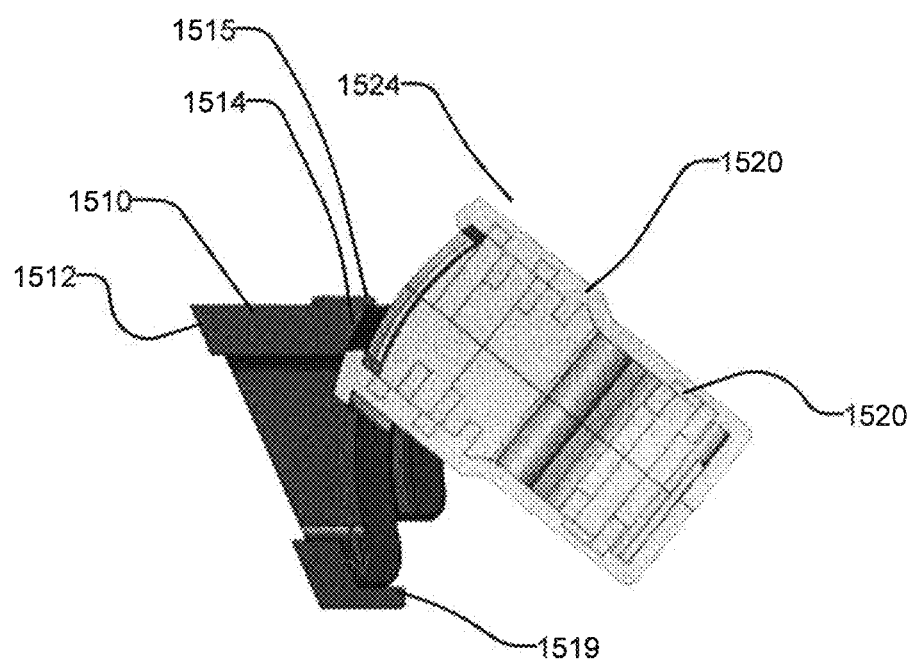

FIGS. 15A and 15B show a display mount 1510 and display unit 1520 according to another embodiment. Display mount 1510 and display unit 1520 are similar to display mount 1210 and display unit 1220 described above, except that the slots in side portions 1517 of display mount 1510 are open on the top and bottom, and tabs 1527 on display unit 1520 extend along substantially the entire length of each side of display unit 1520. Display mount 1510 comprises a catch 1515 near the top of surface 1514 for retaining display unit 1520 in display mount 1510. Catch 1515 may be somewhat flexible such that display unit 1520 may be removed from display mount 1510, but sufficiently rigid such that inadvertent removal is unlikely. Display mount 1510 also comprises a flange 1519 at the bottom portion thereof for preventing display unit 1520 from falling out of display mount 1510. Display unit 1520 may be inserted into display mount 1510 by aligning the bottoms of tabs 1527 with the tops of the slots in side portions 1517 then rotating the front of display unit 1520 downwardly as indicated by the arrow in FIGS. 15A and 15B.

FIGS. 16A through 16D show a display mount 1610 and display unit 1620 according to another embodiment. Display mount 1610 and display unit 1620 are similar to display mount 1210 and display unit 1220 described above, except that instead of having side portions with slots, display mount 1610 comprises a rearward extension 1613 having a socket portion 1615 thereon. Socket portion 1615 is configured to engage a corresponding ball portion 1625 on the rear of display unit 1620 to hold display unit 1620 in place and provide adjustability to display unit 1620.

Figures 17A, 17B:
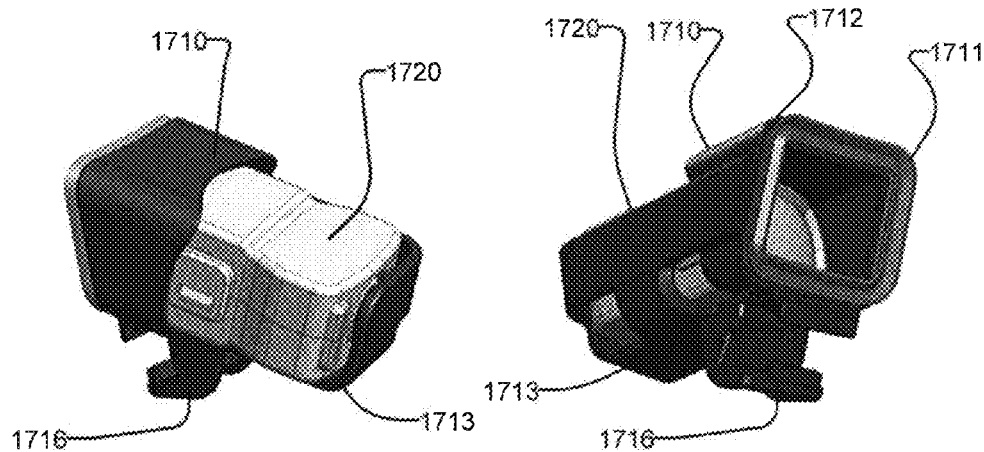
FIGS. 17A and 17D show a display unit and display mount according to another embodiment.
Figures 17C, 17D:
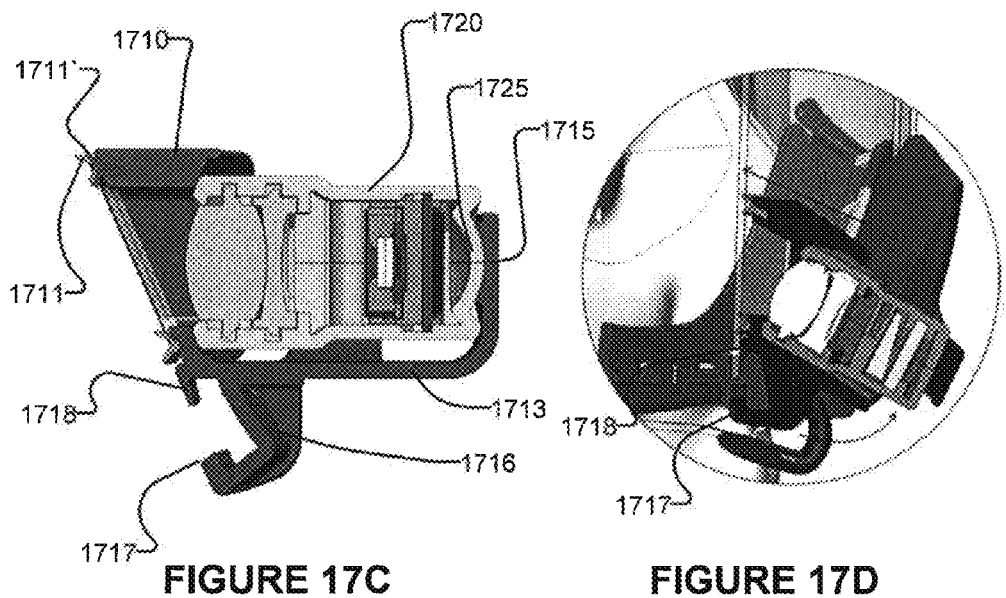

FIGS. 17A through 17D show a display mount 1710 and display unit 1720 according to another embodiment. Display mount 1710 and display unit 1720 are similar to display mount 1610 and display unit 1620 described above, except that instead of being adhesively coupled to the lens assembly of the goggles, display mount 1710 comprises a clip 1716 configured to engage a bottom portion of the frame of the goggles. Clip 1716 is shaped to conform to the profile of the goggles frame. Clip 1716 comprises a lower lip 1717 shaped to engage a notch (e.g. a ventilation notch) in the underside of bottom of the goggles frame, and an upper lip 1718 shaped to fit between the goggle lens and the upper portion of the bottom of the goggles frame, as shown in FIG. 17D. Display mount 1710 also comprises a deformable sealing gasket 1711, and display mount 1710 is configured such that when clip 1716 is engaged with the bottom of the goggles frame, gasket 1711 is deformed by the goggles lens to have a splayed configuration 1711' (see FIG. 17C), in order to provide an improved seal between gasket 1711 and the goggles lens. Other embodiments have combinations of features of the display mounts and display units described above. For example, any of the adhesively coupled display mounts of the embodiments of FIGS. 12 through 16D could be adapted to include a clip such as the clip 1716 of the embodiment of FIGS. 17A-D instead of being configured for adhesive coupling to the goggles lens.

Figure 18:
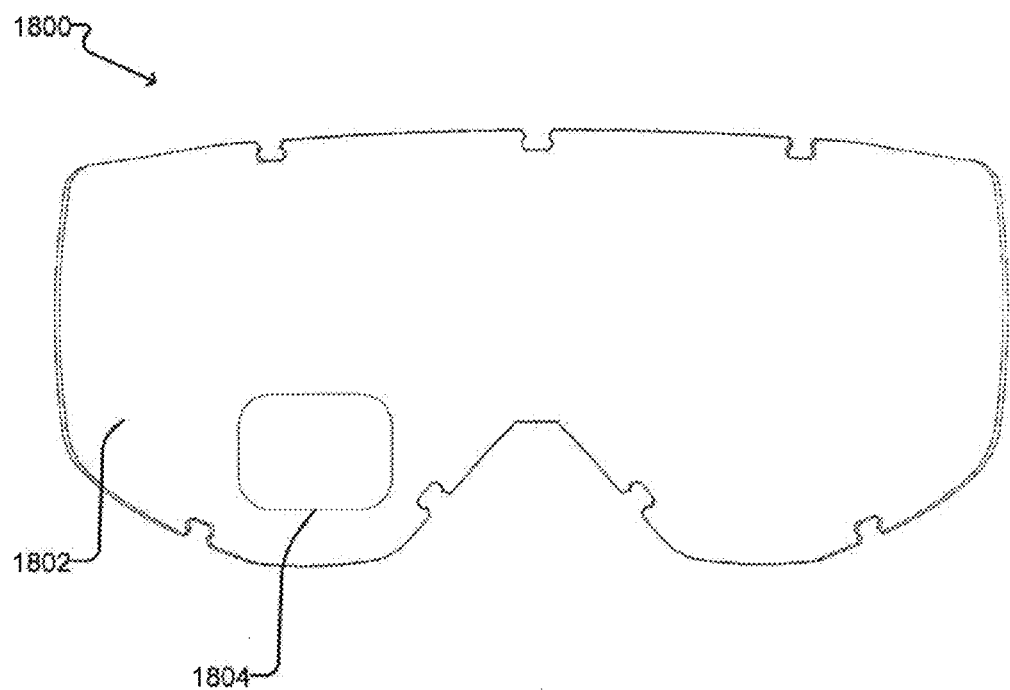
FIG. 18 shows an example template for facilitating attachment of a display mount.

FIG. 18 shows an example template 1800 for facilitating attachment of a display mount (not shown) such as those described above to the lens of a pair of goggles (not shown). Template 1800 comprises a sheet 1802 of material (e.g., paper, thin foam, plastic, or the like) sized and shaped to conform to a corresponding goggles lens profile. An opening 1804 in the sheet 1802 is provided at a predetermined position such that when the sheet 1802 is placed over the goggles lens, a user may attach the display mount to the goggles lens through the opening 1804. Template 1800 may be packaged together with goggles having the corresponding lens profile in some embodiments. A plurality of templates, each having a different corresponding goggles lens profile, may be packaged together with a HUD system as described above in some embodiments.

A number of embodiments described above have referred to the use of goggles in describing the invention. However, the invention is equally applicable to helmets adapted to receive a HUD system similar to the HUD systems disclosed herein. For example, a motorcycle or other helmet may be modified or configured to receive HUD system 200 in substantially the same fashion as described herein. For example, a visor may be modified in a manner similar to the modifications of lens assembly 120 described above. Other components of a HUD system similar to HUD system 200 may be located in a recess defined in a helmet, in padding of a helmet or coupled to the outside of a helmet.

Also, aspects and features disclosed herein may be combined with other types of goggles or other headgear having HUD systems. For example, certain aspects or features of the examples discussed herein may be combined with or incorporated into aspects or features of the examples disclosed in International Application No. PCT/CA2012/050121, filed 29 Feb. 2012, which is hereby incorporated by reference herein.

Where a component (e.g. an assembly, device, etc.) is referred to above, unless otherwise indicated, reference to that component (including reference to a means) should be interpreted as including as equivalents of that component any component which performs the same function as the described component, including components which are not structurally equivalent to the disclosed structures which perform the function in the illustrated exemplary embodiments of the invention.

Unless the context clearly requires otherwise, throughout the description and the claims, the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions.

Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs")). Examples of programmable data processors are: microprocessors, digital signal processors ("DSPs"), embedded processors, graphics processors, math co processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, media players, and other devices suitable for the purposes described herein. Those skilled in the relevant art will appreciate that aspects of the system can be practised with other communications, data processing, or computer system configurations, including: Internet appliances, hand held devices (including personal digital assistants (PDAs)), wearable computers, all manner of cellular or mobile phones, multi processor systems, microprocessor based or programmable consumer electronics (e.g., video projectors, audio visual receivers, displays, such as televisions, and the like), set top boxes, color grading tools, network PCs, mini computers, mainframe computers, and the like.

Aspects of the invention may also be provided in the form of a program product. The program product may comprise any non transitory medium which carries a set of computer readable instructions which, when executed by a data processor, cause the data processor to execute a method of the invention. Program products according to the invention may be in any of a wide variety of forms. The program product may comprise, for example, non transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer readable signals on the program product may optionally be compressed or encrypted.

In some embodiments, aspects of the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context or via other means suitable for the purposes described above.

Where a component (e.g. an assembly, software module, processor, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub combinations as may reasonably be inferred. The scope of the claims should not be limited by the preferred embodiments set forth in the examples, but should be given the broadest interpretation consistent with the description as a whole.

What is claimed is:

1. A Heads-Up Display (HUD) system for mounting on a pair of goggles, the HUD system comprising:

a processing unit configured to be coupled to a strap of the goggles;

a display unit connectable to the processing unit and comprising a display configured to display images under control of the processing unit; and a display mount configured to be coupled to the goggles and adjustably receive the display unit, wherein the display mount comprises a first end configured to conform to and adhesively attach to a lens of the goggles, a second end opposite the first end configured to receive the display unit, and a viewing passage extending through the display mount from the first end to the second end, and wherein the second end of the display mount comprises a concavely-curved surface and the display unit comprises a corresponding convexly-curved surface.

2. A HUD system according to claim 1 wherein an inner surface of the viewing passage is textured to reduce the amount of light reflected from the inner surface.

3. A HUD system according to claim 1 wherein the second end of the display mount comprises side portions having slots therein, and the display unit comprises tabs extending outwardly from the convexly-curved surface and configured to be received in the slots of the side portions of the display mount.

4. A HUD system according to claim 3 wherein the side portions are configured to hold the tabs captive therein, and wherein the slots in the side portions are longer in a vertical direction than the tabs to permit pitch angle adjustment of the display unit with respect to the display mount.

5. A HUD system according to claim 3 wherein the slots in the side portions are open at top and bottom ends thereof, and wherein the display mount comprises a flange at a bottom portion thereof.

6. A HUD system according to claim 3 wherein a distance between the side portions is greater than a width of the display unit behind the tabs to permit yaw angle adjustment of the display unit with respect to the display mount.

7. A HUD system according to claim 3 comprising a deformable catch at a top portion of the second end of the display mount for releasably retaining the display unit in the display mount.

8. A HUD system according to claim 1 wherein the second end of the display mount comprises an extension having a socket portion thereon, the socket portion facing toward the lens of the goggles, and the display unit comprises a ball portion on an end thereof facing away from the lens of the goggles, the ball portion configured to be adjustably received in the socket portion.

9. A HUD system according to claim 1 further comprising at least one template for facilitating adhesive coupling of the display mount to the goggles lens of at least one type of goggles, each template comprising a sheet of material sized and shaped to conform to the goggles lens of the corresponding type of goggles, and an opening at a predetermined location on the sheet of material, the opening sized and shaped to conform to the first end of the display mount.

10. A HUD system according to claim 1 wherein the display unit comprises a glance detector configured to determine whether a user is looking at the display.

11. A HUD system according to claim 1 comprising a cable coupled between the processing unit and the display unit, the cable comprising a connector head at least one end thereof configured to removably couple the cable to one of the processing unit and the display unit.

12. A HUD system according to claim 11 wherein the cable comprises a coiled cable.

13. A HUD system according to claim 11 wherein the cable comprises an extendable cable.

14. A HUD system according to claim 1 further comprising a strap connector for coupling the processing unit to the strap of the goggles, the strap connector having a first side comprising one or more clips configured to engage the strap of the goggles and a second side opposite the first side, the second side comprising connecting features configured to engage corresponding connecting features on the processing unit.

15. A HUD system according to claim 14 wherein the connecting features on the processing unit comprise a slot in one end thereof and a tab on the opposite end thereof, and wherein the connecting features on the second side of the strap connector comprise first and second protrusions extending from the second side, the first protrusion having a tab thereon configured to be inserted into the slot of the processing unit, and the second protrusion having a slot thereon configured to receive the tab of the processing unit.

16. A HUD system according to claim 1, wherein the display unit comprises a housing and a display viewable through an aperture in a front face of the housing, and wherein the corresponding convexly-curved surface is formed by the front face of the housing around the aperture.

* * * * *